(12) United States Patent
Risbeck et al.

(10) Patent No.: US 11,480,360 B2
(45) Date of Patent: Oct. 25, 2022

(54) BUILDING HVAC SYSTEM WITH MODULAR CASCADED MODEL

(71) Applicant: Johnson Controls Technology Company, Auburn Hills, MI (US)

(72) Inventors: Michael J. Risbeck, Madison, WI (US); Michael J. Wenzel, Oak Creek, WI (US); Mohammad N. Elbsat, Milwaukee, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 0 days.

(21) Appl. No.: 16/906,562

(22) Filed: Jun. 19, 2020

(65) Prior Publication Data

US 2021/0041127 A1 Feb. 11, 2021

Related U.S. Application Data

(60) Provisional application No. 62/883,508, filed on Aug. 6, 2019.

(51) Int. Cl.
*G05B 19/042* (2006.01)
*F24F 11/64* (2018.01)

(52) U.S. Cl.
CPC ............ *F24F 11/64* (2018.01); *G05B 19/042* (2013.01); *G05B 2219/2614* (2013.01)

(58) Field of Classification Search
CPC ......... F24F 11/64; F24F 11/62; G05B 19/042; G05B 2219/2614; G05B 23/0254

(Continued)

(56) References Cited

U.S. PATENT DOCUMENTS

| 5,216,612 A | 6/1993 | Cornett et al. |
| 5,630,070 A | 5/1997 | Dietrich et al. |

(Continued)

FOREIGN PATENT DOCUMENTS

| CA | 2499695 | 4/2004 |
| CN | 111895625 A | 11/2020 |

(Continued)

OTHER PUBLICATIONS

Moon, Jin Woo (Performance of ANN-based predictive and adaptive thermal-control methods for disturbances in and around residential buildings, Department of Building Services Engineering, Hanbat National University, South Korea, Building and Environment vol. 48, Feb. 2012, pp. 15-26, Elsevier) (Year: 2012).*

(Continued)

*Primary Examiner* — Michael W Choi
(74) *Attorney, Agent, or Firm* — Foley & Lardner LLP

(57) ABSTRACT

A controller for HVAC equipment stores a cascaded model that includes a disturbance model configured to predict a heat disturbance affecting the building zone as a function of one or more exogenous parameters and a physics model configured to predict a temperature of the building zone as a function of the heat disturbance and an amount of heating or cooling provided to the building zone by HVAC equipment. The processing circuit is configured to execute a combined training procedure to determine parameters of the disturbance model and parameters of the physics model, generate control signals for the HVAC equipment using the disturbance model to predict the heat disturbance and applying the heat disturbance as an input to the physics model, and operate the HVAC equipment to provide the heating or cooling to the building zone in accordance with the control signals.

19 Claims, 5 Drawing Sheets

(58) Field of Classification Search
USPC .......................................................... 700/276
See application file for complete search history.

(56) References Cited

U.S. PATENT DOCUMENTS

| | | |
|---|---|---|
| 6,145,751 A | 11/2000 | Ahmed |
| 7,062,361 B1 | 6/2006 | Lane |
| 7,124,059 B2 | 10/2006 | Wetzer et al. |
| 7,457,762 B2 | 11/2008 | Wetzer et al. |
| 7,464,046 B2 | 12/2008 | Wilson et al. |
| 7,693,735 B2 | 4/2010 | Carmi et al. |
| 8,014,892 B2 | 9/2011 | Glasser |
| 8,126,574 B2 | 2/2012 | Discenzo et al. |
| 8,170,893 B1 | 5/2012 | Rossi |
| 8,396,571 B2 | 3/2013 | Costiner et al. |
| 8,880,962 B2 | 11/2014 | Hosking et al. |
| 8,903,554 B2 | 12/2014 | Stagner |
| 9,058,568 B2 | 6/2015 | Hosking et al. |
| 9,058,569 B2 | 6/2015 | Hosking et al. |
| 9,185,176 B2 | 11/2015 | Nielsen et al. |
| 9,235,847 B2 | 1/2016 | Greene et al. |
| 9,424,693 B2 | 8/2016 | Rodrigues |
| 9,436,179 B1 | 9/2016 | Turney et al. |
| 9,514,577 B2 | 12/2016 | Ahn et al. |
| 9,740,545 B2 | 8/2017 | Aisu et al. |
| 9,760,068 B2 | 9/2017 | Harkonen et al. |
| 10,101,731 B2 | 10/2018 | Asmus et al. |
| 10,175,681 B2 | 1/2019 | Wenzel et al. |
| 10,359,748 B2 | 7/2019 | Elbsat et al. |
| 10,389,136 B2 | 8/2019 | Drees |
| 10,437,241 B2 | 10/2019 | Higgins et al. |
| 10,438,303 B2 | 10/2019 | Chen et al. |
| 10,554,170 B2 | 2/2020 | Drees |
| 10,564,610 B2 | 2/2020 | Drees |
| 10,591,875 B2 | 3/2020 | Shanmugam et al. |
| 10,761,547 B2 | 9/2020 | Risbeck et al. |
| 10,876,755 B2 | 12/2020 | Martin |
| 11,003,175 B2 | 5/2021 | Xenos et al. |
| 2002/0072988 A1 | 6/2002 | Aram |
| 2003/0158803 A1 | 8/2003 | Darken et al. |
| 2004/0049295 A1 | 3/2004 | Wojsznis et al. |
| 2005/0091004 A1 | 4/2005 | Parlos et al. |
| 2007/0227721 A1 | 10/2007 | Springer et al. |
| 2009/0112369 A1 | 4/2009 | Gwerder et al. |
| 2009/0204267 A1 | 8/2009 | Sustaeta et al. |
| 2009/0210081 A1 | 8/2009 | Sustaeta et al. |
| 2009/0240381 A1 | 9/2009 | Lane |
| 2010/0241285 A1 | 9/2010 | Johnson et al. |
| 2010/0262298 A1 | 10/2010 | Johnson et al. |
| 2011/0035328 A1 | 2/2011 | Nielsen et al. |
| 2011/0093310 A1 | 4/2011 | Watanabe et al. |
| 2011/0130857 A1 | 6/2011 | Budiman et al. |
| 2011/0231320 A1 | 9/2011 | Irving |
| 2012/0016607 A1 | 1/2012 | Cottrell et al. |
| 2012/0036250 A1 | 2/2012 | Vaswani et al. |
| 2012/0092180 A1 | 4/2012 | Rikkola et al. |
| 2012/0245968 A1 | 9/2012 | Beaulieu et al. |
| 2012/0259469 A1 | 10/2012 | Ward et al. |
| 2012/0296482 A1 | 11/2012 | Steven et al. |
| 2012/0310860 A1 | 12/2012 | Kim et al. |
| 2012/0316906 A1 | 12/2012 | Hampapur et al. |
| 2013/0006429 A1 | 1/2013 | Shanmugam et al. |
| 2013/0020443 A1 | 1/2013 | Dyckrup et al. |
| 2013/0085614 A1 | 4/2013 | Wenzel et al. |
| 2013/0282195 A1 | 10/2013 | O'Connor et al. |
| 2013/0339080 A1 | 12/2013 | Beaulieu et al. |
| 2014/0163936 A1 | 6/2014 | Hosking et al. |
| 2014/0201018 A1 | 7/2014 | Chassin |
| 2014/0244051 A1 | 8/2014 | Rollins et al. |
| 2014/0277756 A1 | 9/2014 | Bruce et al. |
| 2014/0277769 A1 | 9/2014 | Matsuoka et al. |
| 2014/0316973 A1 | 10/2014 | Steven et al. |
| 2014/0358291 A1 | 12/2014 | Wells |
| 2015/0008884 A1 | 1/2015 | Waki et al. |
| 2015/0027681 A1 | 1/2015 | Ragland et al. |
| 2015/0081107 A1 | 3/2015 | Graham et al. |
| 2015/0311713 A1 | 10/2015 | Asghari et al. |
| 2015/0316903 A1 | 11/2015 | Asmus et al. |
| 2015/0316907 A1 | 11/2015 | Elbsat et al. |
| 2015/0326015 A1 | 11/2015 | Steven et al. |
| 2015/0331972 A1 | 11/2015 | McClure et al. |
| 2015/0371328 A1 | 12/2015 | Gabel et al. |
| 2016/0077880 A1 | 3/2016 | Santos et al. |
| 2016/0092986 A1 | 3/2016 | Lian et al. |
| 2016/0148137 A1 | 5/2016 | Phan et al. |
| 2016/0148171 A1 | 5/2016 | Phan et al. |
| 2016/0190805 A1 | 6/2016 | Steven et al. |
| 2016/0216722 A1 | 7/2016 | Tokunaga et al. |
| 2016/0218505 A1 | 7/2016 | Krupadanam et al. |
| 2016/0246908 A1 | 8/2016 | Komzsik |
| 2016/0275630 A1 | 9/2016 | Strelec et al. |
| 2016/0281607 A1 | 9/2016 | Asati et al. |
| 2016/0305678 A1 | 10/2016 | Pavlovski et al. |
| 2016/0329708 A1 | 11/2016 | Day |
| 2016/0356515 A1* | 12/2016 | Carter ...................... F24F 11/30 |
| 2016/0363948 A1 | 12/2016 | Steven et al. |
| 2016/0373453 A1 | 12/2016 | Ruffner et al. |
| 2016/0379149 A1 | 12/2016 | Saito et al. |
| 2017/0003667 A1 | 1/2017 | Nakabayashi et al. |
| 2017/0083822 A1 | 3/2017 | Adendorff et al. |
| 2017/0097647 A1 | 4/2017 | Lunani et al. |
| 2017/0167742 A1 | 6/2017 | Radovanovic et al. |
| 2017/0169143 A1 | 6/2017 | Farahat et al. |
| 2017/0205818 A1 | 7/2017 | Adendorff et al. |
| 2017/0236222 A1 | 8/2017 | Chen et al. |
| 2017/0268795 A1* | 9/2017 | Yamamoto ........... G05B 19/048 |
| 2017/0309094 A1 | 10/2017 | Farahat et al. |
| 2017/0366414 A1 | 12/2017 | Hamilton et al. |
| 2018/0004171 A1 | 1/2018 | Patel et al. |
| 2018/0004172 A1 | 1/2018 | Patel et al. |
| 2018/0046149 A1 | 2/2018 | Ahmed |
| 2018/0082373 A1 | 3/2018 | Hong et al. |
| 2018/0173214 A1 | 6/2018 | Higgins et al. |
| 2018/0180314 A1* | 6/2018 | Brisette .............. G05B 23/0281 |
| 2018/0203961 A1 | 7/2018 | Aisu et al. |
| 2018/0341255 A1 | 11/2018 | Turney et al. |
| 2018/0373234 A1 | 12/2018 | Khalate et al. |
| 2019/0066236 A1 | 2/2019 | Wenzel |
| 2019/0129403 A1 | 5/2019 | Turney et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0338972 A1 | 11/2019 | Schuster et al. |
| 2019/0338973 A1 | 11/2019 | Turney et al. |
| 2019/0338974 A1 | 11/2019 | Turney et al. |
| 2019/0338977 A1 | 11/2019 | Turney et al. |
| 2019/0347622 A1 | 11/2019 | Elbsat et al. |
| 2019/0354071 A1 | 11/2019 | Turney et al. |
| 2020/0019129 A1 | 1/2020 | Sircar et al. |
| 2020/0088427 A1 | 3/2020 | Li et al. |
| 2020/0090289 A1 | 3/2020 | Elbsat et al. |
| 2020/0096985 A1 | 3/2020 | Wenzel et al. |
| 2020/0166230 A1* | 5/2020 | NG ........................ F24F 11/62 |
| 2020/0191427 A1 | 6/2020 | Martin |
| 2020/0200423 A1 | 6/2020 | Gervais |
| 2020/0301408 A1 | 9/2020 | Elbsat et al. |

FOREIGN PATENT DOCUMENTS

| | | |
|---|---|---|
| EP | 3 447 258 A1 | 2/2019 |
| JP | 2001-357112 | 12/2001 |
| JP | 2003-141178 | 5/2003 |
| JP | 2005-148955 A | 6/2005 |
| JP | 2005-182465 | 7/2005 |
| JP | 2010078447 A * | 4/2010 |
| JP | 2012-073866 | 4/2012 |
| WO | WO-2011/072332 A1 | 6/2011 |
| WO | WO-2016/144586 | 9/2016 |

(56) References Cited

FOREIGN PATENT DOCUMENTS

| WO | WO-2017/062896 A1 | 4/2017 |
|---|---|---|
| WO | WO-2018/217251 A1 | 11/2018 |

OTHER PUBLICATIONS

U.S. Appl. No. 16/294,433, filed Mar. 6, 2019, Hitachi-Johnson Controls Air Conditioning, Inc.
Afram et al., "Artificial Neural Network (ANN) Based Model Predictive Control (MPC) and Optimization of HVAC Systems: A State of the Art Review and Case Study of a Residential HVAC System," Energy and Buildings, Apr. 15, 2017, 141, pp. 96-113.
Aynur, "Variable refrigerant flow systems: A review." Energy and Buildings, 2010, 42.7, pp. 1106-1112.
Chan et al., "Estimation of Degradation-Based Reliability in Outdoor Environments," Statistics Preprints, Jun. 19, 2001, 25, 33 pages.
Chu et al., "Predictive maintenance: The one-unit replacement model," International Journal of Production Economics, 1998, 54.3, pp. 285-295.
Chua et al., "Achieving better energy-efficient air conditioning-a review of technologies and strategies," Applied Energy, 2013, 104, pp. 87-104.
Crowder et al., "The Use of Degradation Measures to Design Reliability Test Plans." World Academy of Science, Engineering and Technology, International Journal of Mathematical, Computational, Physical, Electrical and Computer Engineering, 2014, 8, 18 pages.
De Carlo et al., "Maintenance Cost Optimization in Condition Based Maintenance: A Case Study for Critical Facilities," International Journal of Engineering and Technology, Oct.-Nov. 2013, 5.5, pp. 4296-4302.
Costa et al., "A multi-criteria model for auditing a Predictive Maintenance Programme," European Journal of Operational Research, Sep. 29, 2011, 217.2, pp. 381-393.
Emmerich et al., "State-of-the-Art Review of CO2 Demand Controlled Ventilation Technology and Application," NISTIR, Mar. 2001, 47 pages.
Fu et al., "Predictive Maintenance in Intelligent-Control-Maintenance-Management System for Hydroelectric Generating Unit," IEEE Transactions on Energy Conversion, Mar. 2004, 19.1, pp. 179-186.
Fuller, Life-Cycle Cost Analysis (LCCA) I WBDG—Whole Building Design Guide, National Institute of Standards and Technology (NIST), https://www.wbdg.org/resources/life-cycle-cost-analysis-lcca, 2016, pp. 1-13.
Gedam, "Optimizing R&M Performance of a System Using Monte Carlo Simulation", 2012 Proceedings Annual Reliability and Maintainability Symposium, 2012, pp. 1-6.
Grall et al., "Continuous-Time Predictive-Maintenance Scheduling for a Deteriorating System," IEEE Transactions on Reliability, Jun. 2002, 51.2, pp. 141-150.
Hagmark, et al., "Simulation and Calculation of Reliability Performance and Maintenance Costs", 2007 Annual Reliability and Maintainability Symposium, IEEE Xplore, 2007, pp. 34-40, 2007.
Hong et al. "Development and Validation of a New Variable Refrigerant Flow System Model in Energyplus," Energy and Buildings, 2016, 117, pp. 399-411.
Hong et al., "Statistical Methods for Degradation Data With Dynamic Covariates Information and an Application to Outdoor Weathering Data," Technometrics, Nov. 2014, 57.2, pp. 180-193.
International Search Report and Written Opinion on PCT/US2018/018039, dated Apr. 24, 2018, 14 pages.
JP2003141178 WIPO Translation, Accessed Feb. 18, 2020, 15 pages.
Kharoufeh et al., "Semi-Markov Models for Degradation-Based Reliability," IIE Transactions, May 2010, 42.8, pp. 599-612.
Li et al., "Reliability Modeling and Life Estimation Using an Expectation Maximization Based Wiener Degradation Model for Momentum Wheels" IEEE Transactions on Cybernetics, May 2015, 45.5, pp. 969-977.
Mohsenian-Rad et al., "Smart Grid for Smart city Activities in the California City of Riverside," In: Alberto Leon-Garcia et al.: "Smart City 360°", Aug. 6, 2016, 22 Pages.
Office Action on EP 18150740.1, dated Nov. 5, 2019, 6 pages.
Office Action on EP 18176474.7 dated Sep. 11, 2019. 5 pages.
Office Action on EP 18176474.7, dated Feb. 10, 2020, 6 pages.
Office Action on EP 18190786.6, dated Feb. 5, 2020, 4 pages.
Pan et al., "Reliability modeling of degradation of products with multiple performance characteristics based on gamma processes," Reliability Engineering & System Safety, 2011, 96.8, pp. 949-957.
Peng et al., "Bayesian Degradation Analysis with Inverse Gaussian Process Models Under Time-Varying Degradation Rates," IEEE Transactions on Reliability, Mar. 2017, 66.1, pp. 84-96.
Peng et al., "Bivariate Analysis of Incomplete Degradation Observations Based On Inverse Gaussian Processes and Copulas," IEEE Transactions on Reliability, Jun. 2016, 65.2, pp. 624-639.
Peng et al., "Switching State-Space Degradation Model with Recursive Filter/Smoother for Prognostics of Remaining Useful Life," IEEE Transactions on Industrial Informatics, Feb. 2019, 15.2, pp. 822-832.
Perez-Lombard et al., "A review on buildings energy consumption information," Energy and Buildings, 2008, 40.3, pp. 394-398.
Rahman et al., "Cost Estimation for Maintenance Contracts for Complex Asset/Equipment", 2008 IEEE International Conference on Industrial Engineering and Engineering Management, 2008, pp. 1355-1358.
Ruijters et al., "Fault Maintenance Trees: Reliability Centered Maintenance via Statistical Model Checking", 2016 Annual Reliability and Maintainability Symposium (RAMS), Jan. 25-28, 2016, pp. 1-6.
Wan et al., "Data Analysis and Reliability Estimation of Step-Down Stress Accelerated Degradation Test Based on Wiener Process," Prognostics and System Health Management Conference (PHM-2014 Hunan), Aug. 2014, 5 pages.
Wang et al., "Reliability and Degradation Modeling with Random or Uncertain Failure Threshold," Reliability and Maintainability Symposium, 2007, pp. 392-397.
Ward et al., "Beyond Comfort—Managing the Impact of HVAC Control on the Outside World," Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.
Xiao et al., "Optimal Design for Destructive Degradation Tests with Random Initial Degradation Values Using the Wiener Process," IEEE Transactions on Reliability, Sep. 2016, 65.3, pp. 1327-1342.
Xu et al., "Real-time Reliability Prediction for a Dynamic System Based on the Hidden Degradation Process Identification," IEEE Transactions on Reliability, Jun. 2008, 57.2, pp. 230-242.
Yang et al., "Thermal comfort and building energy consumption implications-a review," Applied Energy, 2014, 115, pp. 164-173.
Zhang et al., "A Novel Variable Refrigerant Flow (VRF) Heat Recovery System Model: Development and Validation," Energy and Buildings, Jun. 2018, 168, pp. 399-412.
Zhang et al., "An Age- and State-Dependent Nonlinear Prognostic Model for Degrading Systems," IEEE Transactions on Reliability, Dec. 2015, 64.4, pp. 1214-1228.
Zhang et al., "Analysis of Destructive Degradation Tests for a Product with Random Degradation Initiation Time," IEEE Transactions on Reliability, Mar. 2015, 64.1, pp. 516-527.
Zhou et al. "Asset Life Prediction Using Multiple Degradation Indicators and Lifetime Data: a Gamma-Based State Space Model Approach," 2009 8th International Conference on Reliability, Maintainability and Safety, Aug. 2009, 5 pages.
Zhou et al., "Reliability-centered predictive maintenance scheduling for a continuously monitored system subject to degradation," Reliability Engineering & System Safety, 2007, 92.4, pp. 530-534.
Astrom. "Optimal Control of Markov Decision Processes with Incomplete State Estimation," J. Math. Anal. Appl., 1965, 10, pp. 174-205.
Bittanti et al., Adaptive Control of Linear Time Invariant Systems: The "Bet on the Best" Principle, Communications in Information and Systems, 2006, 6.4, pp. 299-320.

(56) References Cited

OTHER PUBLICATIONS

Chen et al., "Control-oriented System Identification: an H1 Approach," Wiley-Interscience, 2000, 19, Chapters 3 & 8, 38 pages.
Feng et al., "Model Predictive Control of Radiant Slab Systems with Evaporative Cooling Sources," Energy and Buildings, 2015, 87, pp. 199-210.
Hardt et al., "Gradient Descent Learns Linear Dynamical Systems," Journal of Machine Learning Research, 2018, 19, pp. 1-44.
Helmicki et al. "Control Oriented System Identification: a Worst-case/deterministic Approach in H1," IEEE Transactions on Automatic Control, 1991, 36.10, pp. 1163-1176.
International Search Report and Written Opinion on PCT/US2020/045237, dated Nov. 10, 2020, 18 pages.
Kelman et al., "Bilinear Model Predictive Control of a HVAC System Using Sequential Quadratic Programming," Proceedings of the IFAC World Congress, Sep. 2, 2011, 6 pages.
Kingma et al.,. "Adam: A Method for Stochastic Optimization," International Conference on Learning Representations (ICLR), 2015, 15 pages.
Ljung et al., "Theory and Practice of Recursive Identification," vol. 5. JSTOR, 1983, Chapters 2, 3 & 7, 80 pages.
Ljung, editor. "System Identification: Theory for the User," 2nd Edition, Prentice Hall, Upper Saddle River, New Jersey, 1999, Chapters 5 and 7, 40 pages.
Nevena et al., "Data center cooling using model-predictive control," 32nd Conference on Neural Information Processing Systems, 2018, 10 pages.
Yudong et al., "Predictive Control for Energy Efficient Buildings with Thermal Storage: Modeling, Stimulation, and Experiments." IEEE Control Systems, Feb. 2012, 32.1, pp. 44-64.
Extended European Search Report on EP 18806317.6, dated Jun. 17, 2021, 10 pages.
Freire et al., "Predictive controllers for thermal comfort optimization and energy savings," Energy and Buildings, 2008, vol. 40, No. 7, pp. 1353-1365.
Nwankpa et al., "Activation Functions: Comparison of Trends in Practice and Research for Deep Learning," Engineering, University of Strathclyde, Glasgow, UK, 2018, 20 pages.
Schiavon et al., "Dynamic predictive clothing insulation models based on outdoor air and indoor operative temperatures," 2013, Building and Environment, 59, pp. 250-260.
Shanker et al., "Effect of Data Standardization on Neural Network Training," Omega, Int. J. Mgmt. Sci., 1996, vol. 24, No. 4, pp. 385-397.
Srivastava et al., "Dropout: a simple way to prevent neural networks from overfitting," Journal of Machine Learning Research, 2014, vol. 15, No. 1, pp. 1929-1958.
Taleghani et al., "A review into thermal comfort in buildings," Renewable and Sustainable Energy Reviews, Oct. 2013, vol. 26, pp. 201-215.
Timplalexis et al., "Thermal Comfort Metabolic Rate and Clothing Inference," Centre for Research and Technology Hellas/Information Technologies Institute, Greece, Sep. 2019, pp. 690-699.
Weigel et al., "applying GIS and OR Techniques to Solve Sears Technician-Dispatching and Home Delivery Problems," Interface, Jan.-Feb. 1999, 29:1, pp. 112-130 (20 pages total).
International Search Report and Written Opinion on PCT/US2020/042916, dated Oct. 8, 2020, 14 pages.
International Search Report and Written Opinion on PCT/US2020/045238, dated Oct. 26, 2020, 14 pages.
Doring, Matthias, "Prediction vs Forecasting: Predictions do not always concern the future . . . ," Data Science Blog, URL: https://www.datascienceblog.net/post/machine-learning/forecasting_vs_prediction/, 3 pages, Dec. 9, 2018, 3 pages.
Office Action on JP 2020-107153, dated Oct. 5, 2021, 7 pages with English language translation.
Furuta et al., "Optimal Allocation of Fuzzy Controller and its rule tuning for Structural Vibration," Journal of Japan Society for Fuzzy Theory and Intelligent Informatics, Dec. 2008, vol. 20, No. 6 (pp. 921-934).
JP Office Action on JP Appl. Ser. No. 2020-109855 dated Dec. 7, 2021, with English language translation. (10 pages).
Japanese Office Action on JP Appl. No. 2019-554919 dated Mar. 29, 2022 (9 pages with English language translation).
International Preliminary Report on Patentability on PCT Appl. Ser. No. PCT/US2020/045238 dated Feb. 17, 2022 (8 pages).
International Preliminary Report on Patentability on PCT Appl. Ser. No. PCT/US2020/042916 dated Feb. 3, 2022 (8 pages).
International Preliminary Report on Patentability on PCT Appl. Ser. No. PCT/US2020/045237 dated Feb. 17, 2022 (11 pages).
JP Office Action on JP Appl. Ser. No. 2020-109855 dated Jul. 12, 2022, with translation (7 pages).

\* cited by examiner

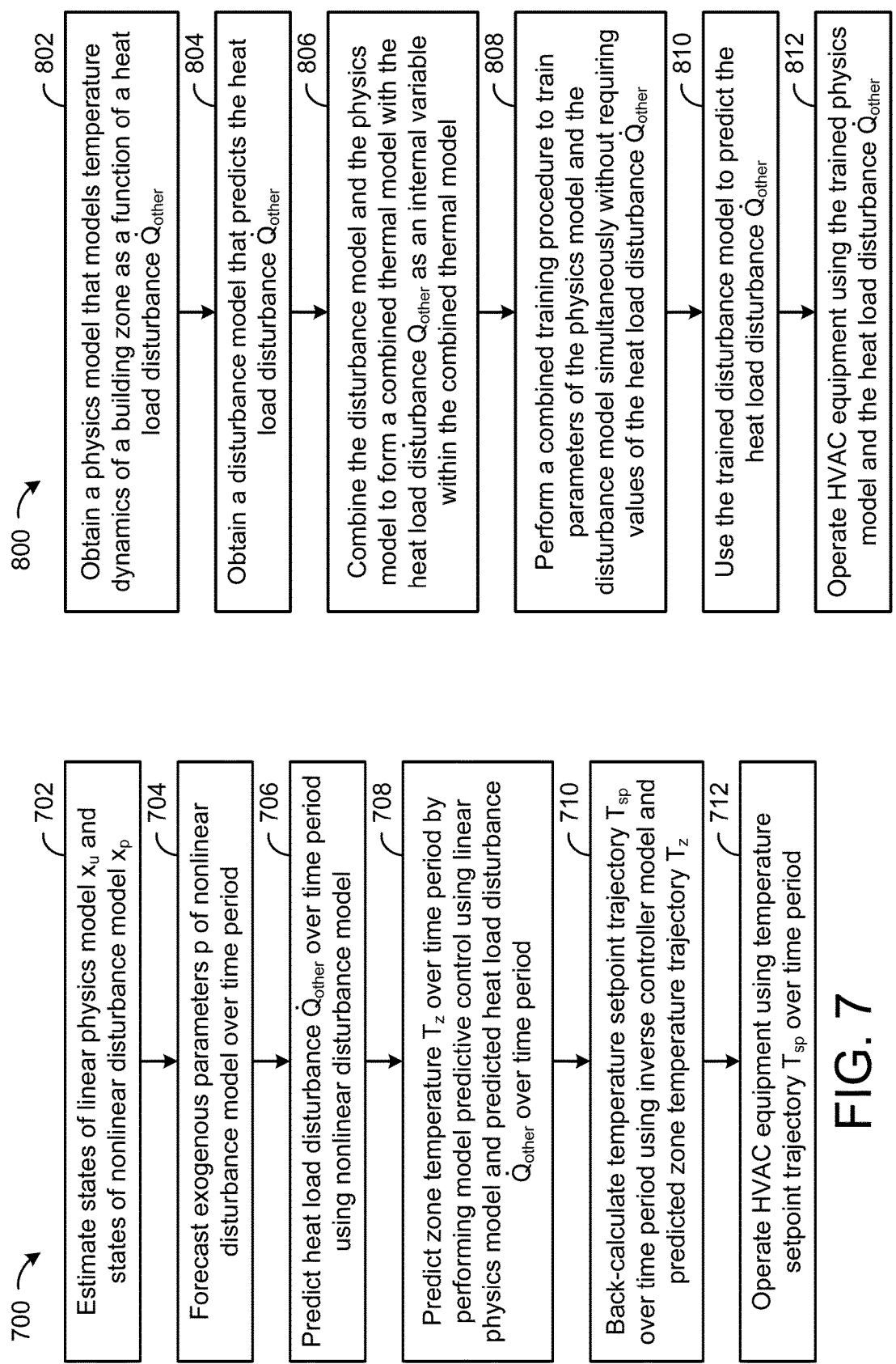

BUILDING HVAC SYSTEM WITH MODULAR CASCADED MODEL

CROSS-REFERENCE TO RELATED PATENT APPLICATION

This application claims the benefit of and priority to U.S. Provisional Patent Application No. 62/883,508 filed Aug. 6, 2019, the entire disclosure of which is incorporated by reference herein.

BACKGROUND

The present disclosure relates generally to control systems for building equipment, and more particularly to a model predictive control system for building heating, ventilation, or air conditioning (HVAC) equipment.

Model predictive control (MPC) is an advanced control technique that is used to control a system or process while satisfying a set of constraints. In the context of a building HVAC system, MPC can be used to control the temperature of a building zone subject to constraints that define comfortable temperature limits for the building zone. MPC includes a combination of optimization and state prediction. The optimization component of MPC typically includes optimizing an objective function or cost function to determine optimal values of a set of decision variables. The state prediction component of MPC predicts how the modeled states of the system evolve as a function of the decision variables. The predictive model is typically used as a constraint on the optimization to ensure that the values of the decision variables respect the dynamics of the system defined by the predictive model.

The temperature dynamics of a building zone include a linear component and a nonlinear component. Some temperature dynamics can be represented by linear equations (e.g., simple conduction across a thermal resistor), whereas other temperature dynamics are nonlinear (e.g., convection heat transfer, radiation heat transfer, etc.). It can be difficult to capture the temperature dynamics of a building zone in a predictive model that is well-suited for MPC. Additionally, it can be difficult to train some types of predictive models due to the lack of available training data. For example, models that predict a heat disturbance affecting a building zone typically require values of the heat disturbance as training data. However, the heat disturbance is neither controlled nor measured and therefore may be difficult to provide as training data.

SUMMARY

One implementation of the present disclosure is a controller for heating, ventilation, or air conditioning (HVAC) equipment for a building zone. The controller includes a processing circuit having a processor and memory storing a cascaded model. The cascaded model includes a disturbance model configured to predict a heat disturbance affecting the building zone as a function of one or more exogenous parameters and a physics model configured to predict a temperature of the building zone as a function of the heat disturbance and an amount of heating or cooling provided to the building zone by HVAC equipment. In some embodiments, the disturbance model is a nonlinear model and the physics model is a linear model. The processing circuit is configured to execute a combined training procedure to determine parameters of the disturbance model and parameters of the physics model. The processing circuit is configured to generate control signals for the HVAC equipment using the disturbance model to predict the heat disturbance and applying the heat disturbance as an input to the physics model. The processing circuit is configured to operate the HVAC equipment to provide the heating or cooling to the building zone in accordance with the control signals.

In some embodiments, the disturbance model comprises a neural network model having one or more internal states. The processing circuit may be configured to update the internal states of the neural network model using updated values of the exogenous parameters and configured to translate the internal states of the neural network into a prediction of the heat disturbance.

In some embodiments, the physics model includes a state-space model having a zone air temperature state representing the temperature of the building zone and at least one of a first input representing the amount of heating or cooling provided to the building zone by the HVAC equipment or a second input representing the heat disturbance. The processing circuit may be configured to adjust the first input representing the amount of heating or cooling provided to the building zone by the HVAC equipment while holding the second input at a fixed value of the heat disturbance provided by the disturbance model.

In some embodiments, generating the control signals for the HVAC equipment includes using the disturbance model to predict the heat disturbance affecting the building zone in a pre-processing step, using the physics model to generate one or more constraints on a model predictive control process, and executing the model predictive control process to generate at least one of heating or cooling duties for the HVAC equipment or a target temperature of the building zone, wherein the heat disturbance is a fixed input to the model predictive control process.

In some embodiments, generating the control signals for the HVAC equipment includes executing a model predictive control process to predict at least one of heating or cooling duties for the HVAC equipment or the temperature of the building zone and translating at least one of the heating or cooling duties for the HVAC equipment or the temperature of the building zone into a temperature setpoint for the building zone.

In some embodiments, the cascaded model further includes a controller model that defines a relationship between the temperature setpoint for the building zone and at least one of the heating or cooling duties for the HVAC equipment or the temperature of the building zone. In some embodiments, the processing circuit is configured to use the controller model to translate at least one of the heating or cooling duties for the HVAC equipment or the temperature of the building zone into the temperature setpoint.

In some embodiments, the cascaded model further comprises a controller model representing a controller that generates the control signals for the HVAC equipment based on an output of the model predictive control process. In some embodiments, the processing circuit is configured to use the controller model to generate one or more constraints on the model predictive control process that ensure the output of the model predictive control process is achievable by the controller.

In some embodiments, the processing circuit is configured to forecast a time series of the exogenous parameters over a duration of a time period. The exogenous parameters may include at least one of a time of day, a day type, a weather parameter, or a solar irradiance parameter. In some embodiments, the processing circuit is configured to apply the time series of the exogenous parameters as inputs to the disturbance model.

In some embodiments, the heat disturbance is an output of the disturbance model and an input to the physics model. The processing circuit may be configured to train both the disturbance model and the physics model without requiring values of the heat disturbance as training data.

In some embodiments, the processing circuit is configured to invert a controller model for the building zone to generate an inverted controller model and use the inverted controller model to generate a temperature setpoint for the building zone as a function of one or more values of the temperature of the building zone.

Another implementation of the present disclosure is a method for operating heating, ventilation, or air conditioning (HVAC) equipment for a building zone. The method includes obtaining a cascaded model including a disturbance model configured to predict a heat disturbance affecting the building zone as a function of one or more exogenous parameters and a physics model configured to predict a temperature of the building zone as a function of the heat disturbance and an amount of heating or cooling provided to the building zone by HVAC equipment. In some embodiments, the disturbance model is a nonlinear model and the physics model is a linear model. The method includes executing a combined training procedure to determine parameters of the disturbance model and parameters of the physics model. The method includes generating control signals for the HVAC equipment using the disturbance model to predict the heat disturbance and applying the heat disturbance as an input to the physics model. The method includes operating the HVAC equipment to provide the heating or cooling to the building zone in accordance with the control signals.

In some embodiments, the disturbance model includes a neural network model having one or more internal states. The method may include updating the internal states of the neural network model using updated values of the exogenous parameters and configured to translate the internal states of the neural network into a prediction of the heat disturbance.

In some embodiments, the physics model includes a state-space model having a zone air temperature state representing the temperature of the building zone and at least one of a first input representing the amount of heating or cooling provided to the building zone by the HVAC equipment or a second input representing the heat disturbance. The method may include adjusting the first input representing the amount of heating or cooling provided to the building zone by the HVAC equipment while holding the second input at a fixed value of the heat disturbance provided by the disturbance model.

In some embodiments, generating the control signals for the HVAC equipment includes using the disturbance model to predict the heat disturbance affecting the building zone in a pre-processing step, using the physics model to generate one or more constraints on a model predictive control process, and executing the model predictive control process to generate at least one of heating or cooling duties for the HVAC equipment or a target temperature of the building zone, wherein the heat disturbance is a fixed input to the model predictive control process.

In some embodiments, generating the control signals for the HVAC equipment includes executing a model predictive control process to predict at least one of heating or cooling duties for the HVAC equipment the temperature of the building zone and translating at least one of the heating or cooling duties for the HVAC equipment or the temperature of the building zone into a temperature setpoint for the building zone.

In some embodiments, the cascaded model further includes a controller model that defines a relationship between the temperature setpoint for the building zone and at least one of the heating or cooling duties for the HVAC equipment or the temperature of the building zone. In some embodiments, the method includes using the controller model to translate at least one of the heating or cooling duties for the HVAC equipment or the temperature of the building zone into the temperature setpoint.

In some embodiments, the cascaded model further comprises a controller model representing a controller that generates the control signals for the HVAC equipment based on an output of the model predictive control process. In some embodiments, the method includes using the controller model to generate one or more constraints on the model predictive control process that ensure the output of the model predictive control process is achievable by the controller.

In some embodiments, the method includes forecasting a time series of the exogenous parameters over a duration of a time period. The exogenous parameters may include at least one of a time of day, a day type, a weather parameter, or a solar irradiance parameter. In some embodiments, the method includes applying the time series of the exogenous parameters as inputs to the disturbance model.

In some embodiments, the heat disturbance is an output of the disturbance model and an input to the physics model. The method may include training both the disturbance model and the physics model without requiring values of the heat disturbance as training data.

In some embodiments, the method includes inverting a controller model for the building zone to generate an inverted controller model and using the inverted controller model to generate a temperature setpoint for the building zone as a function of one or more values of the temperature of the building zone.

Another implementation of the present disclosure is a method for training and using predictive models for a building zone. The method includes obtaining a disturbance model that predicts a heat disturbance affecting the building zone as an output of the disturbance model, obtaining a physics model that models temperature dynamics of a building zone as a function of the heat disturbance, combining the disturbance model and the physics model to form a combined thermal model containing the heat disturbance as an internal variable within the combined thermal model, and executing a training procedure to determine parameters of the disturbance model and parameters of the physics model without requiring values of the heat disturbance as training data. In some embodiments, the disturbance model is a nonlinear model and the physics model is a linear model.

In some embodiments, the method includes using the disturbance model and the physics model to operate heating, ventilation, or air conditioning (HVAC) equipment to provide heating or cooling to the building zone.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is a flowchart of a process which can be performed by the controller of FIG. 6 to operate the HVAC equipment that provide heating or cooling to the building zone, according to some embodiments.

FIG. 8 is a flowchart of a process which can be performed by the controller of FIG. 6 to train the combined thermal model of FIG. 5, according to some embodiments.

DETAILED DESCRIPTION

Referring generally to the FIGURES, systems and methods for performing model predictive control (MPC) are shown, according to some embodiments. MPC can be performed to determine a cost effective solution to operating building equipment over a time horizon.

AI can prove useful in the problem of determining appropriate constraints for the MPC algorithm. MPC can operate on fixed constraints for the whole day that it optimizes over. However, if these constraints could be found at a higher resolution, such as hourly constraints, benefits in both financial savings and comfort can be realized. Integration of AI with MPC can also lead to other improvements in the MPC strategy. For example, AI can lead to improvements in disturbance prediction, estimation, constraint generation, system modeling, and optimization. These and other features of MPC are discussed herein.

Building HVAC Systems

Figure 1:
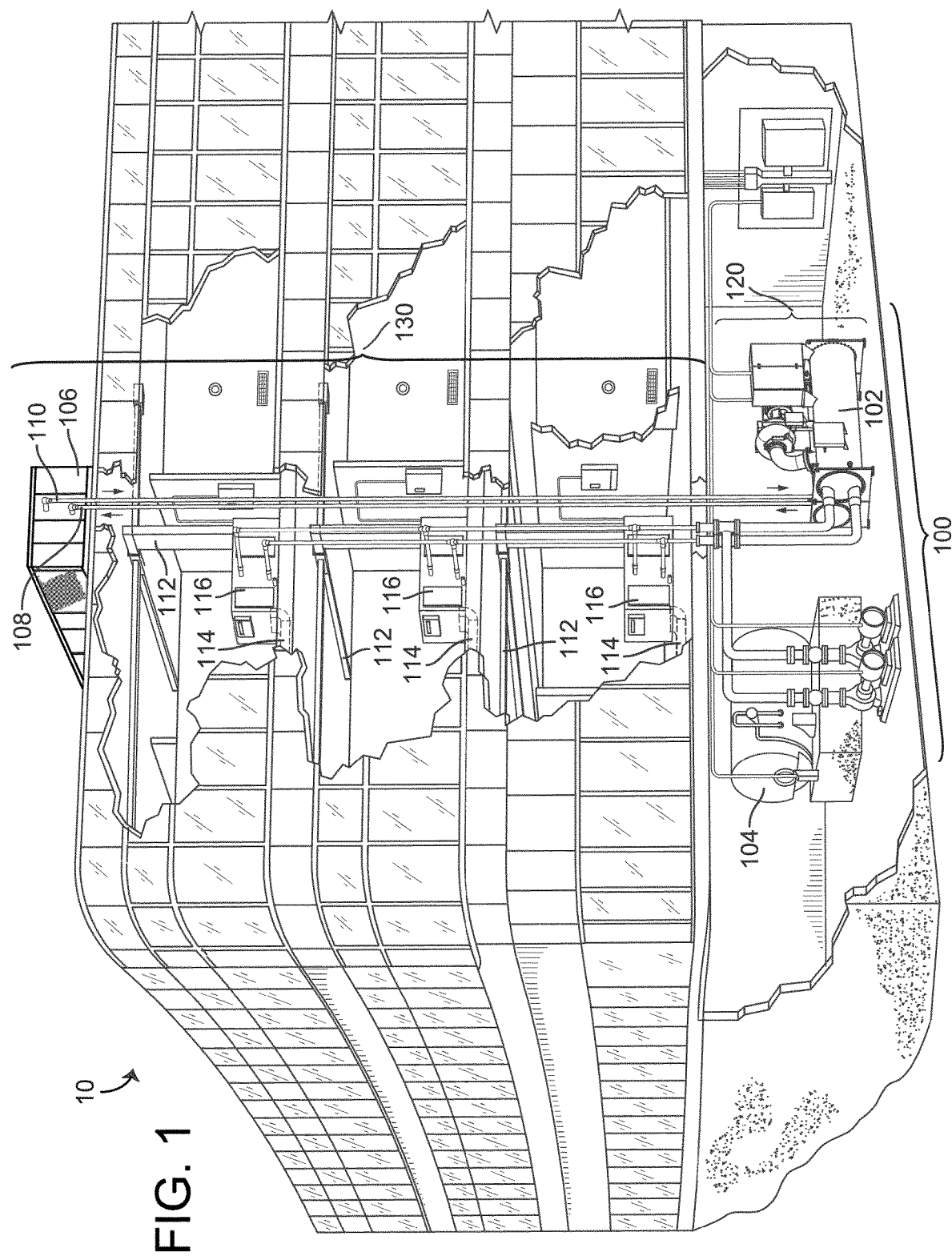
FIG. 1 is an illustration of a building equipped with a HVAC system, according to some embodiments.

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to building 10. Building 10 may also be affected by other sources of heat transfer that influence the temperature of indoor air within building 10. The building mass (e.g., walls, floors, furniture) influences the indoor air temperature of building 10 by storing or transferring heat (e.g., if the indoor air temperature is less than the temperature of the building mass, heat transfers from the building mass to the indoor air). People, electronic devices, other appliances, etc. ("heat load") also contribute heat to building 10 through body heat, electrical resistance, etc. Additionally, the outside air temperature impacts the temperature of building 10 by transferring heat to building 10 (e.g., if the outdoor air is warmer than the indoor air within building 10) or drawing heat from building 10 (e.g., if the outdoor air is colder than the indoor air within building 10).

HVAC System and Model

Figure 2:
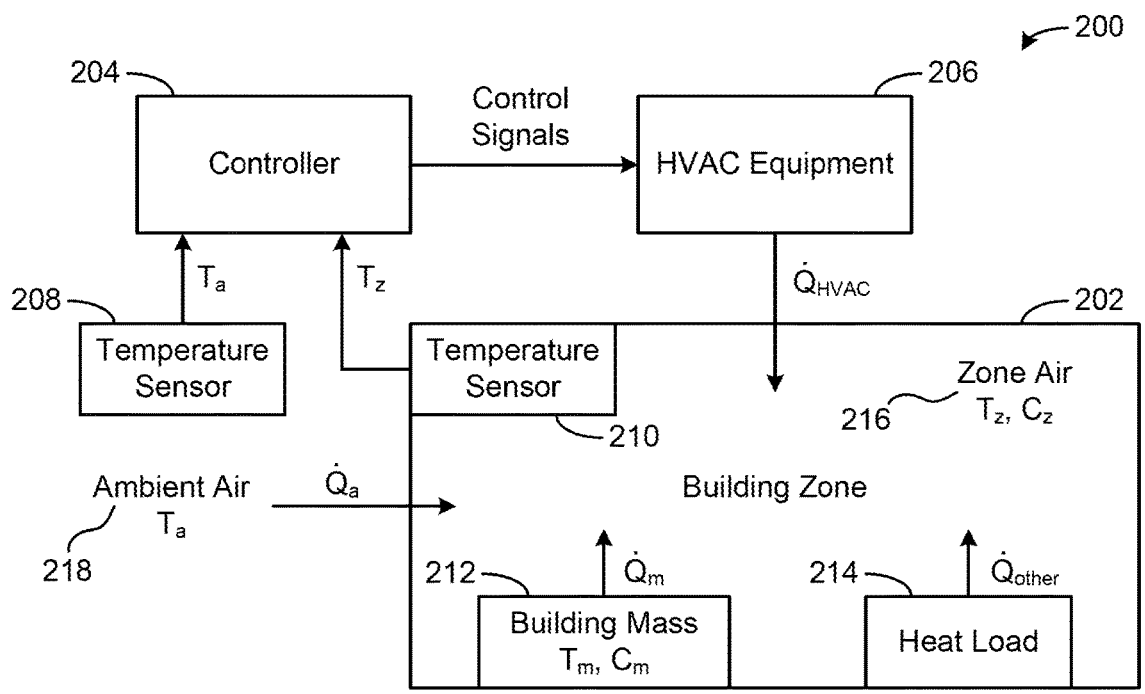
FIG. 2 is a block diagram illustrating several sources of heat transfer affecting a building zone within the building of FIG. 1, according to some embodiments.
Figure 3:
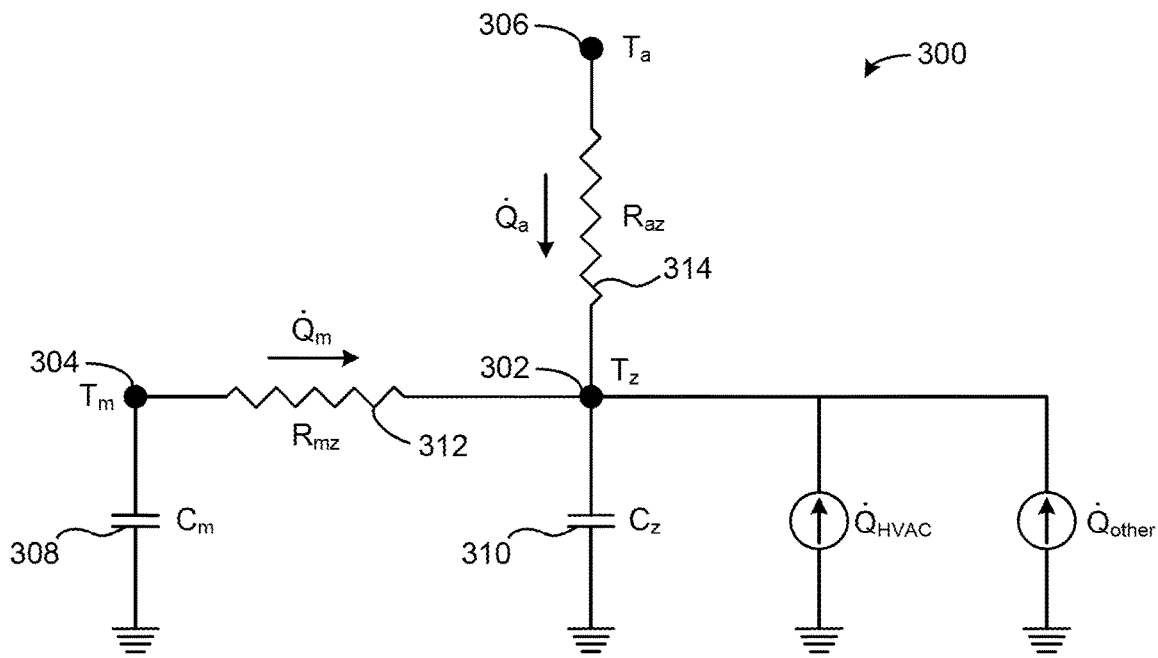
FIG. 3 is a thermal circuit diagram illustrating several sources of heat transfer affecting the building zone of FIG. 2, according to some embodiments.

Referring now to FIGS. 2-3, a block diagram 200 and thermal circuit diagram 300 illustrating several sources of heat transfer that affect the temperature within a building zone 202 are shown, according to an exemplary embodiment. Zone 202 may be located within building 10 and may include a room, a set of rooms, a floor, a space, or any other location within building 10. Zone 202 may be served by HVAC equipment 206, which may include some or all of the equipment of HVAC system 100 (e.g., boilers, chillers, air handling units, etc.), as described with reference to FIG. 1. HVAC equipment 206 may operate to provide heating or cooling $\dot{Q}_{HVAC}$ to zone 202 to maintain the temperature $T_z$ of zone 202 at or near a desired temperature (e.g., at a temperature setpoint, within a setpoint range, etc.) to promote the comfort of occupants within zone 200 and/or to meet other needs of zone 200. $\dot{Q}_{HVAC}$ may include heat flow into zone 202 when HVAC equipment 206 operate in a heating mode or heat flow out of zone 202 when HVAC equipment 206 operate in a cooling mode. $\dot{Q}_{HVAC}$ may have a positive value when HVAC equipment 206 operate in the heating mode and a negative value when HVAC equipment 206 operate in the cooling mode.

Zone air 216 includes air within zone 202 and can be modeled as having a zone air temperature $T_z$ and a thermal capacitance $C_z$, shown in diagram 300 as temperature node 302 and thermal capacitor 310 respectively. Zone air temperature $T_z$ is affected by several sources of heat transfer including heating or cooling $\dot{Q}_{HVAC}$ provided by HVAC equipment 206, heat $\dot{Q}_m$ exchanged between zone air 216 and building mass 212, heat $\dot{Q}_a$ exchanged between zone air 216 and ambient air 218 outside zone 202, and heat $\dot{Q}_{other}$ generated by heat load 214 within zone 202. A temperature sensor 210 may be positioned within zone 202 and configured to measure the zone air temperature $T_z$. Temperature sensor 210 may communicate the zone air temperature $T_z$ to a controller 204, which operates to control HVAC equipment 206.

Building mass 212 includes non-air mass within zone 202 (e.g., walls, floors, ceilings, furniture, solid objects, etc.) which can exchange heat $\dot{Q}_m$ with zone air 216. Building mass 212 can be modeled as having a mass temperature $T_m$ and a thermal capacitance $C_m$, shown in diagram 300 as temperature node 304 and thermal capacitor 308 respectively. Building mass 212 may reject heat $\dot{Q}_m$ to zone air 216 when the mass temperature $T_m$ is greater than the zone air temperature $T_z$ or may absorb heat $\dot{Q}_m$ from zone air 216 when the mass temperature $T_m$ is less than the zone air temperature $T_z$. Accordingly, the value of $\dot{Q}_m$ may be positive when building mass 212 rejects heat to zone air 216 and negative when building mass 212 absorbs heat from zone air 216. The thermal resistance $R_{mz}$ between building mass 212 and zone air 216 may be represented as a thermal resistor 312 as shown in diagram 300.

Heat load 214 may include occupants within zone 202 (e.g., people, animals, etc.) that produce body heat as well as computers, lighting, and/or other electronic devices that generate heat through electrical resistance. In some embodiments, heat load 214 includes sunlight that transfers heat into zone via solar irradiance or other sources of heat transfer into zone 202 via thermal radiation. The total amount of heat generated by heat load 214 can be modeled as $\dot{Q}_{other}$.

Ambient air 218 may include outdoor air or air within another building zone that exchanges heat $\dot{Q}_a$ with zone air 216. The temperature $T_a$ of ambient air 218 (represented by temperature node 306 in diagram 300) may be measured by a temperature sensor 208 and provided as an input to controller 204. Ambient air 218 may reject heat $\dot{Q}_a$ to zone air 216 when the ambient air temperature $T_a$ is greater than the zone air temperature $T_z$ or may absorb heat $\dot{Q}_a$ from zone air 216 when the ambient air temperature $T_a$ is less than the zone air temperature $T_z$. Accordingly, the value of $\dot{Q}_a$ may be positive when ambient air 218 rejects heat to zone air 216 or negative when ambient air 218 absorbs heat from zone air 216. The thermal resistance $R_{az}$ between ambient air 218 and zone air 218 is represented by a thermal resistor 314 and may depend on the barriers to heat transfer at the perimeter of building zone 216 (e.g., wall insulation, closed windows, etc.).

Controller 204 receives the temperature measurements $T_z$ and $T_a$ from sensors 208-210 and provides control signals to HVAC equipment 206. In some embodiments, the control signals include heating or cooling duties for HVAC equipment 206. Advantageously, controller 204 may consider the sources of heat transfer provided by heat load 204 (i.e., $\dot{Q}_{other}$), building mass 212 (i.e., $\dot{Q}_m$), and ambient air 218 (i.e., $\dot{Q}_a$) on the zone air temperature $T_z$ and may operate HVAC equipment 206 to provide a suitable amount of heating or cooling HVAC to maintain the zone air temperature $T_z$ within an acceptable range. The operation of controller 204 is discussed in detail below.

Referring particularly to FIG. 3, diagram 300 models zone 202 as a two thermal resistance, two thermal capacitance, control-oriented thermal mass system. This model can be characterized by the following system of linear differential equations:

$$C_z \dot{T}_z = \frac{1}{R_{mz}}(T_m - T_z) + \frac{1}{R_{az}}(T_a - T_z) + \dot{Q}_{HVAC} + \dot{Q}_{other} \quad \text{(Eq. 1)}$$

$$C_m \dot{T}_m = \frac{1}{R_{mz}}(T_z - T_m) \quad \text{(Eq. 2)}$$

where Eq. 1 models the temperature $T_z$ of zone air 216 and Eq. 2 models the temperature $T_m$ of building mass 212. Controller 204 may use these equations (e.g., state-space models based on these equations) to generate the control signals for HVAC equipment 206.

Each term in Eq. 1 corresponds to a branch of diagram 300. Zone air temperature node 302 represents the zone air temperature $T_z$. From zone air temperature node 302, diagram 300 branches in several directions, including down to a ground via thermal capacitor 310 having a thermal capacitance of $C_z$. Thermal capacitor 310 models the ability of zone air 216 store heat (i.e., the amount of heat needed to change the zone air temperature $T_z$ by a given amount) and is associated with the rate of change $\dot{T}_z$ of the zone air temperature $T_z$. The product of the thermal capacitance $C_z$ of zone air 216 and the rate of change of the temperature $T_z$ of zone air 216 (i.e., $C_z \dot{T}_z$) forms the left side of Eq. 1.

From zone air temperature node 302, diagram 300 also branches left to building mass temperature node 304, which corresponds to the temperature $T_m$ of building mass 212. A thermal resistor 312 having a thermal resistance of $R_{mz}$ separates zone air temperature node 302 and building mass temperature node 304. The heat transfer $\dot{Q}_m$ from building mass 212 to zone air 216 (or vice versa) is equivalent to the term $$\frac{1}{R_{mz}}(T_m - T_z)$$

in the first equation. This term is included on the right side of the Eq. 1 as contributing to the rate of change of the zone air temperature $\dot{T}_z$.

From zone air temperature node 302, diagram 300 also branches up to ambient air temperature node 306, which corresponds to the temperature $T_a$ of ambient air 218. A thermal resistor 314 having a thermal resistance of $R_{az}$ separates zone air temperature node 302 and ambient air temperature node 206. The heat transfer $\dot{Q}_a$ from ambient air 218 to zone air 216 or vice versa) is equivalent to the term $$\frac{1}{R_{az}}(T_a - T_z) \text{ in Eq. 1.}$$

This term is included on the right side of the Eq. 1 as contributing to the rate of change of the zone air temperature $\dot{T}_z$.

Also from zone air temperature node 302, diagram 300 branches right to two heat sources $\dot{Q}_{HVAC}$ and $\dot{Q}_{other}$. As discussed above, $\dot{Q}_{other}$ represents heat flow into zone 202 from heat load 214, whereas $\dot{Q}_{HVAC}$ represents heat flow into zone 202 from HVAC equipment 206. In some embodiments, $\dot{Q}_{other}$ is not measured or controlled by HVAC equipment 206 or controller 204, yet contributes to the rate of change of the zone air temperature $T_z$. Controller 204 may use a disturbance model to predict the values of $\dot{Q}_{other}$, as described in greater detail below. Conversely, $\dot{Q}_{HVAC}$ is generated by HVAC equipment 206 and can be controlled by controller 204 as needed to manage the zone air temperature $T_z$. Both $\dot{Q}_{HVAC}$ and $\dot{Q}_{other}$ are included on the right side of Eq. 1 as contributing to the rate of change of the zone air temperature $\dot{T}_z$.

The second equation (Eq. 2) models the rate of change $\dot{T}_m$ of the building mass temperature $T_m$. Thermal capacitor 308 models the ability of building mass 212 store heat (i.e., the amount of heat needed to change the building mass temperature $T_m$ by a given amount) and is associated with the rate of change $\dot{T}_m$ of the building mass temperature $T_m$. The product of the thermal capacitance $C_m$ of building mass 212 and the rate of change of the temperature $T_m$ of building mass 212 (i.e., $C_m \dot{T}_m$) forms the left side of Eq. 2. The heat transfer $\dot{Q}_m$ from zone air 216 to building mass 212 (or vice versa) is equivalent to the term $$\frac{1}{R_{mz}}(T_z - T_m) \text{ in Eq. 2.}$$

This term is included on the right side of the Eq. 2 as contributing to the rate of change of the building mass temperature $\dot{T}_m$.

Eq. 1 and Eq. 2 can be divided by $C_z$ and $C_m$ respectively and rewritten in state-space form as shown in the following equation:

$$\begin{bmatrix} \dot{T}_z \\ \dot{T}_m \end{bmatrix} = \begin{bmatrix} -\left(\frac{1}{C_z R_{mz}} + \frac{1}{C_z R_{az}}\right) & \frac{1}{C_z R_{mz}} \\ \frac{1}{C_m R_{mz}} & -\frac{1}{C_m R_{mz}} \end{bmatrix} \quad \text{(Eq. 3)}$$

$$\begin{bmatrix} T_z \\ T_m \end{bmatrix} + \begin{bmatrix} \frac{1}{C_z} & \frac{1}{C_z R_{az}} & \frac{1}{C_z} \\ 0 & 0 & 0 \end{bmatrix} \begin{bmatrix} \dot{Q}_{HVAC} \\ T_a \\ \dot{Q}_{other} \end{bmatrix}$$

where $\dot{T}_z$ is the rate of change of the zone air temperature $T_z$, $\dot{T}_m$ is the rate of change of the building mass temperature $T_m$, $R_{mz}$ is the thermal resistance between building mass 212 and zone air 216, $C_m$ is the thermal capacitance of building mass 212 (e.g., Joules/° C.), $C_z$ is the thermal capacitance of zone air 216 (e.g., Joules/° C.), $R_{az}$ is the thermal resistance between ambient air 218 and zone air 216, $T_z$ is the temperature of zone air 216, $T_m$ is the temperature of building mass 212, $\dot{Q}_{HVAC}$ indicates heating or cooling contributed by HVAC equipment 206, $T_a$ is the temperature of ambient air 218, and $\dot{Q}_{other}$ is the heat generated by heat load 214.

Modeling System with Disturbance Model, Physics Model, and Controller Model

Figure 4:
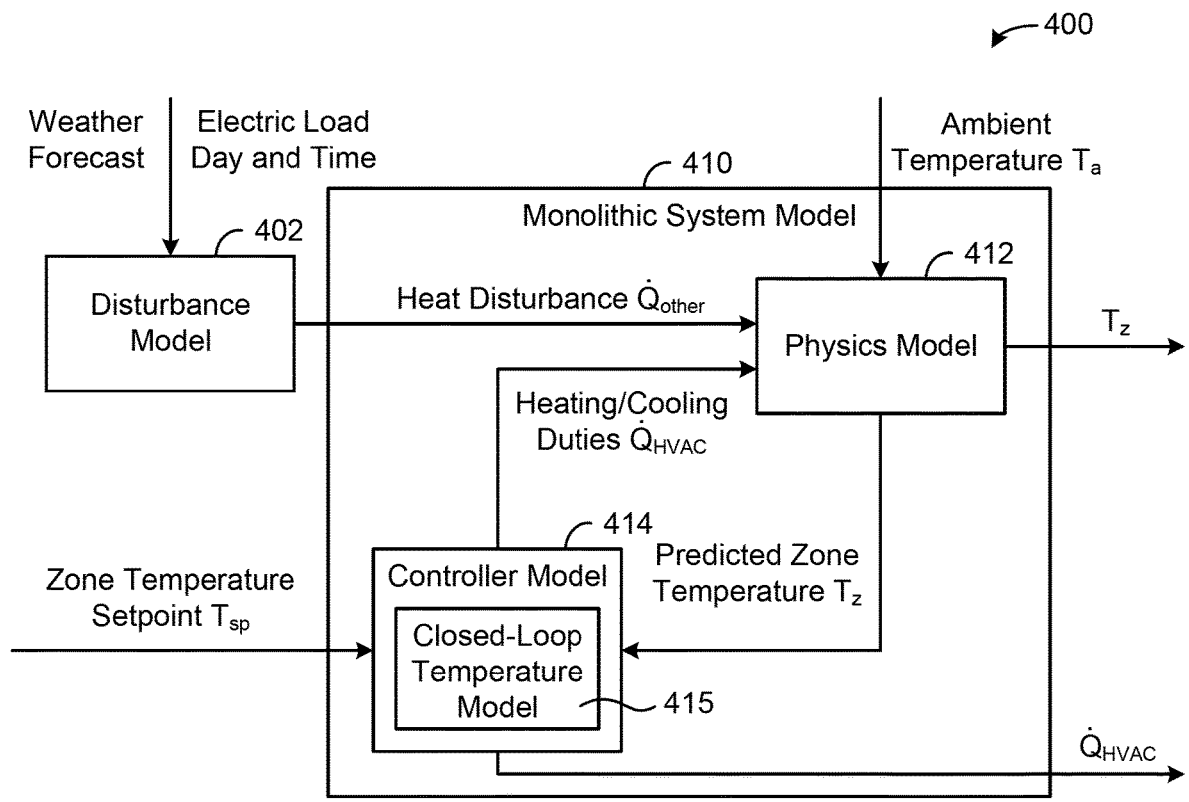
FIG. 4 is a block diagram of a modeling system including a disturbance model, a physics model, and a controller model which can be used to control the building zone of FIG. 2, according to some embodiments.

Referring now to FIG. 4, a modeling system 400 which can be used by controller 204 to operate HVAC equipment 206 is shown, according to an exemplary embodiment. Modeling system 400 is shown to include a disturbance model 402 and a monolithic system model 410. Controller 204 can use disturbance model 402 to predict the heat disturbance $\dot{Q}_{other}$ affecting building zone 202. In some embodiments, controller 204 uses disturbance model 402 to predict $\dot{Q}_{other}$ as a function of a weather forecast, a current day and time, and/or an electric load of building zone 202. The weather forecast may include a forecast of outside air temperature, outside air humidity, outside air pressure, precipitation, cloudiness, or any other weather-related parameter. For embodiments in which ambient air 218 is outside air, the weather forecast may include predictions of the ambient air temperature $T_a$. The electric load of building zone 202 may include a forecast or measurements of electricity consumption (e.g., kW) within building zone 202. In some embodiments, disturbance model 402 receives other inputs such as measured or predicted occupancy of building zone 202 or other inputs that may be relevant to calculating the heat disturbance $\dot{Q}_{other}$. Disturbance model 402 may provide a prediction of $\dot{Q}_{other}$ to monolithic system model 410.

In some embodiments, monolithic system model 410 receives the prediction of $\dot{Q}_{other}$ from disturbance model 402 as well as a zone temperature setpoint $T_{sp}$. The zone temperature setpoint $T_{sp}$ may be provided by a user, set via a thermostat, received from a supervisory controller, or any other data source. In some embodiments, monolithic system model 410 also receives the ambient temperature $T_a$ as input. Controller 204 may use monolithic system model 410 and the values of $\dot{Q}_{other}$, $T_{sp}$, and $T_a$ to generate control signals for HVAC equipment 206 (e.g., values of the heating or cooling duty $\dot{Q}_{HVAC}$) and predict temperatures $T_z$ of building zone 202 that result from the heating or cooling duty $\dot{Q}_{HVAC}$ in combination with the inputs to monolithic system model 410.

Monolithic system model 410 is shown to include a physics model 412 and a controller model 414. Physics model 412 may model the temperature dynamics of building zone 202. For example, physics model 412 may receive the heat disturbance $\dot{Q}_{other}$ as well as the heating or cooling duty $\dot{Q}_{HVAC}$ for HVAC equipment 206 as inputs and may predict the temperature $T_z$ of building zone 202 as an output. Controller model 414 may model the behavior of a closed loop feedback controller that generates a control signal for HVAC equipment 206 based on the temperature setpoint $T_{sp}$ and the zone temperature $T_z$. For example, controller model 414 may receive the temperature setpoint $T_{sp}$ and the zone temperature $T_z$ as inputs and may output the heating or cooling duty $\dot{Q}_{HVAC}$ for HVAC equipment 206 as an output.

In conventional model predictive control systems, physics model 412 and controller model 414 are typically combined into a single monolithic system model 410 that models both the temperature dynamics of building zone 202 as well as the behavior of a closed loop feedback controller that provides control signals to HVAC equipment 206. An example of such a conventional implementation is described in detail in U.S. Pat. No. 9,852,481 granted Dec. 26, 2017, the entire disclosure of which is incorporated by reference herein. Conversely, physics model 412 and controller model 414 are split into separate models in modeling system 400. One advantage of splitting physics model 412 and controller model 414 into separate models is that it allows each model 412-414 to be trained and used separately. For example, physics model 412 can be trained in combination with disturbance model 402 in a combined training procedure (described in greater detail with reference to FIG. 5), whereas controller model 414 can be trained using a separate training process (e.g., a regression process).

Another advantage of splitting physics model 412 and controller model 414 into separate models is that it allows physics model 412 and controller model 414 to be used separately. For example, controller 204 can use physics model 412 to perform a model predictive control process to generate values of both $T_z$ and $\dot{Q}_{HVAC}$. The values of $T_z$ and $\dot{Q}_{HVAC}$ can then be provided as inputs to controller model 414 and used to back-calculate the zone temperature setpoint $T_{sp}$ as a function of these inputs. The back-calculation process is described in greater detail with reference to FIG. 6.

Another advantage of splitting physics model 412 and controller model 414 into separate models is that it allows physics model 412 and controller model 414 to be different types of models. For example, physics model 412 may be a linear state-space model, whereas controller model 414 may be a nonlinear model. This advantage allows controller 204 to use only the linear state-space model (i.e., physics model 412) when performing the model predictive control process, which reduces computation time and uses fewer processing resources due to physics model 412 not including any nonlinear components. Any nonlinearity in controller model 414 can be accounted for in a post-processing step used to back-calculate the zone temperature setpoint $T_{sp}$ after the model predictive control process is complete. These and other advantages of splitting physics model 412 and controller model 414 into separate models are described in greater detail below.

Still referring to FIG. 4, several of the variables used by modeling system 400 are shown as inputs of one model (e.g., physics model 412, controller model 414, monolithic system model 410) and outputs of another model (e.g., physics model 412, controller model 414, disturbance model 402, monolithic system model 410). For a given model, the present disclosure refers to the model's controllable input variables as "inputs u" and refers to the model's outputs variables as "outputs y." Uncontrolled input variables are referred to as "disturbances" or "exogenous parameters p." For any model that has internal states, the present disclosure refers to such states as "states x." Table 1 illustrates which of the variables shown in FIG. 4 are used as inputs u, outputs y, disturbances, and states x for each of physics model 412, controller model 414, disturbance model 402, and monolithic system model 410.

TABLE 1

Variables Used in Each Model

| Variable | Physics Model | Controller Model | Disturbance Model | Monolithic Model |
|---|---|---|---|---|
| $T_z$ | Output & State | Disturbance | — | Output |
| $T_m$ | State | — | — | — |
| $\dot{Q}_{HVAC}$ | Input | Output | — | Output |
| $T_a$ | Disturbance | — | Disturbance | Disturbance |
| $T_{sp}$ | — | Input | — | Input |
| $\dot{Q}_{other}$ | Disturbance | — | Output | — |
| $\mathcal{C}$ | — | — | Disturbance | Disturbance |
| t | — | — | Disturbance | Disturbance |

Many of the variables shown in Table 1 are the same as described above. The new variables shown in Table 1 are $\mathcal{C}$ and t. The variable $\mathcal{C}$ represents cloudiness (e.g., an amount of cloud cover at the location of building 10 at a given time) and may be specified as a fraction, percentage, or other value between a minimum value (no clouds) and a maximum value (completely cloudy). For example, a value of $\mathcal{C} = 0$ may indicate no cloud cover (i.e., the sky is completely clear) whereas a value of $\mathcal{C} = 1$ may indicate complete cloud cover (i.e., the sky is completely cloudy). The variable t represents the current day and time. Controller 204 may use the variable t to predict the value of time-dependent disturbances such as internal heat load $\dot{Q}_{other}$ that varies based on the time of day or the day of the week.

Notably, physics model 412 may use the zone temperature $T_z$ as both a state x and an output y because the zone temperature $T_z$ is an observable state x and can be provided as an output of physics model 412. The variables labeled as disturbances in Table 1 are exogenous inputs (i.e., inputs that are not directly controlled or affected by adjusting the inputs u for a given model). This distinction may not be relevant from a modeling perspective, but has ramifications for the model predictive control process performed by controller 204. Specifically, controller 204 may use the values of the disturbance variables to set the values of fixed parameters in the model predictive control process, whereas the inputs u may be used as decision variables that can be adjusted by controller 204.

Physics Model

In some embodiments, physics model 412 receives the heat disturbance $\dot{Q}_{other}$, the heating or cooling duties $\dot{Q}_{HVAC}$, and the ambient temperature $T_a$ as inputs and predicts the zone temperature $T_z$ that will result from these inputs. In other embodiments, physics model 412 receives the heat disturbance $\dot{Q}_{other}$ and the ambient temperature $T_a$ as inputs; however, controller 204 may use physics model 412 in a model predictive control process to generate a set of heating or cooling duties $\dot{Q}_{HVAC}$ and predict the resulting zone temperature $T_z$ that will result from these heating or cooling duties $\dot{Q}_{HVAC}$ in combination with the other inputs $\dot{Q}_{other}$ and $T_a$. The model predictive control process is described in greater detail with reference to FIG. 6.

In some embodiments, physics model 412 is a discrete-time state-space model having the following form:

$$x^+ = Ax + Bu \quad \text{(Eq. 4)}$$

$$y = Cx \quad \text{(Eq. 5)}$$

where notation $x^+$ denotes the predicted values of the system states x at the next time step (e.g., time step t+1) given the values of the system states x at the current time step (e.g., time step t). The matrices A, B, and C, may include trainable system parameters (e.g., θ) that can be generated by performing a training process (described in greater detail below). The system states x, inputs u, and outputs y of physics model 412 may be defined as vectors as shown in Eq. 6-8:

$$x = \begin{bmatrix} T_z \\ T_m \end{bmatrix} \quad \text{(Eq. 6)}$$

$$u = \begin{bmatrix} \dot{Q}_{HVAC} \\ T_a \\ \dot{Q}_{other} \end{bmatrix} \quad \text{(Eq. 7)}$$

$$y = T_z \quad \text{(Eq. 8)}$$

In some embodiments, physics model 412 is the discrete-time parametric form of Eq. 3 shown above. For example, Eq. 3 can be rewritten in discrete-time parametric form as shown in the following equation:

$$\begin{bmatrix} T_z \\ T_m \end{bmatrix}^+ = A(\theta) \begin{bmatrix} T_z \\ T_m \end{bmatrix} + B(\theta) \begin{bmatrix} \dot{Q}_{HVAC} \\ T_a \\ \dot{Q}_{other} \end{bmatrix} \quad \text{(Eq. 9)}$$

where the notation $$\begin{bmatrix} T_z \\ T_m \end{bmatrix}^+$$

ITT denotes the predicted values of $T_z$ and $T_m$ at the next time step (e.g., time step t+1) given the values of $T_z$ and $T_m$ at the current time step (e.g., time step t) and $A(\theta)$ and $B(\theta)$ are discrete-time matrices defined as:

$$A(\theta) = \exp m(A_c(\theta)\Delta) \quad \text{(Eq. 10a)}$$

$$B(\theta) = A_c(\theta)^{-1}(A(\theta) - I)B_c(\theta) \quad \text{(Eq. 11a)}$$

where the function expm( ) is the matrix exponential function, $\Delta$ is the sampling interval, I is the identity matrix, and $A_c(\theta)$ and $B_c(\theta)$ are continuous-time matrices defined as follows:

$$A_c(\theta) = \begin{bmatrix} -\left(\dfrac{1}{C_z R_{mz}} + \dfrac{1}{C_z R_{az}}\right) & \dfrac{1}{C_z R_{mz}} \\ \dfrac{1}{C_m R_{mz}} & -\dfrac{1}{C_m R_{mz}} \end{bmatrix} \quad \text{(Eq. 10b)}$$

$$B_c(\theta) = \begin{bmatrix} \dfrac{1}{C_z} & \dfrac{1}{C_z R_{az}} & \dfrac{1}{C_z} \\ 0 & 0 & 0 \end{bmatrix} \quad \text{(Eq. 11b)}$$

The values of the parameters θ within matrices $A(\theta)$, $B(\theta)$, $A_c(\theta)$ and/or $B_c(\theta)$ can be determined by performing a training procedure, described in greater detail below.

Controller Model

In some embodiments, controller model 414 receives the predicted zone temperature $T_z$ from physics model 412 as well as the zone temperature setpoint $T_{sp}$ and generates a value of the heating or cooling duty $\dot{Q}_{HVAC}$ needed to drive the zone temperature $T_z$ to the temperature setpoint $T_{sp}$. In other embodiments, controller 204 uses controller model 414 to back-calculate the zone temperature setpoint $T_{sp}$ using values of the predicted zone temperature $T_z$ and the heating or cooling duty $\dot{Q}_{HVAC}$. For example, controller 204 may use physics model 412 in a model predictive control process to generate a set of heating or cooling duties $\dot{Q}_{HVAC}$ and predict the zone temperature $T_z$ that will result from these heating or cooling duties $\dot{Q}_{HVAC}$. Both the heating or cooling duties $\dot{Q}_{HVAC}$ and the zone temperature $T_z$ can be provided as inputs to controller model 414. Controller 204 may then use controller model 414 to back-calculate the temperature setpoint $T_{sp}$ as a function of the heating or cooling duties $\dot{Q}_{HVAC}$ and the zone temperature $T_z$.

As shown in Table 1, all inputs u and outputs y of controller model 414 are measurable or controllable quantities. Thus, controller model 414 can be developed as a state-space model directly from input and output data in some embodiments. However, a challenge that arises when both physics model 412 and controller model 414 are state-space models is that errors in controller model 414 are propagated to physics model 412 when models 412-414 are connected. Similarly, errors in physics model 412 may be propagated to controller model 414 when models 412-414 are combined. Thus, it may be advantageous to develop controller model 414 to be independent from the accuracy of physics model 412.

In some embodiments, controller model 414 includes a closed-loop temperature model 415 configured to predict the value of $T_z$ at time t+1 given values of $T_z$ and $T_{sp}$ and any other relevant inputs at time t. Closed-loop temperature model 415 may be similar to monolithic system model 410, but without the added complexity of also predicting $\dot{Q}_{HVAC}$. Advantageously, because closed-loop temperature model 415 may only predict $T_z$ and can ignore $\dot{Q}_{HVAC}$, closed-loop temperature model 415 may be significantly easier to develop than monolithic system model 410. For example, because the goal of the HVAC equipment controller modeled by closed-loop temperature model 415 (e.g., a closed-loop feedback controller) is to drive the zone temperature $T_z$ to the setpoint $T_{sp}$, any reasonably stable model with a suitable time constant can be used as closed-loop temperature model 415.

One example of closed-loop temperature model 415 is shown in the following equation:

$$T_{z,t+1} = T_{sp,t} \quad \text{(Eq. 12)}$$

where $T_{z,t+1}$ is the predicted temperature $T_z$ of building zone 202 at time t+1 and $T_{sp,t}$ is the temperature setpoint for building zone 202 at time t. This embodiment of closed-loop temperature model 415 implies that controller 204 is able to achieve perfect control of building zone 202 within a single time step and may be accurate for sufficiently small setpoint changes (e.g., changes that can be achieved in less than one time step). In other words, this embodiment of closed-loop temperature model 415 indicates that the zone temperature $T_z$ reaches and stays at the temperature setpoint $T_{sp}$ in one time step. While this may be a good approximation for small setpoint changes, it may not be accurate for setpoint changes that cannot be achieved in one time step.

Another example of closed-loop temperature model 415 is shown in the following equation:

$$T_{z,t+1} = T_{sp,t} + \alpha \tanh(\beta(T_{sp,t} - T_{z,t})) \quad \text{(Eq. 13)}$$

where $T_{z,t+1}$ is the predicted temperature $T_z$ of building zone 202 at time t+1, $T_{sp,t}$ is the temperature setpoint for building zone 202 at time t, $T_{z,t}$ is the temperature of building zone 202 at time t, $\alpha$ and $\beta$ are trainable model parameters, and tanh( ) is the hyperbolic tangent function. The value of $T_{z,t}$ may be received as an input from temperature sensor 210 or predicted using physics model 412 or closed-loop temperature model 415 in various embodiments. This embodiment of closed-loop temperature model 415 still predicts that the zone temperature $T_z$ will approach the temperature setpoint $T_{sp}$, but limits the amount the zone temperature $T_z$ can move in one time step to the value of the parameter $\alpha$. In some embodiments, controller 204 performs a regression process using historical values of $T_z$ and $T_{sp}$ to generate values of the parameters $\alpha$ and $\beta$ in controller model 414.

In some embodiments, closed-loop temperature model 415 can be any linear or nonlinear model that predicts $T_{z,t+1}$ as a function of $T_{sp,t}$ and $T_{z,t}$. For example, closed-loop temperature model 415 may have the form:

$$T_{z,t+1} = c(T_{z,t}, T_{sp,t}) \quad \text{(Eq. 14)}$$

where the function c(•) is any function that relates $T_{z,t+1}$ to $T_{sp,t}$ and $T_{z,t}$ (e.g., Eqs. 12-13 or a feedforward neural network).

To predict $\dot{Q}_{HVAC}$, controller model 414 combines closed-loop temperature model 415 and physics model 412 (Eq. 4-5), which can be expressed as:

$$x_{t+1} = Ax_t + B_u u_t + B_Q \dot{Q}_{HVAC} \quad \text{(Eq. 15)}$$

$$T_{z,t+1} = Cx_{t+1} \quad \text{(Eq. 16)}$$

where $u_t$ represents the inputs to physics model 212 other than $\dot{Q}_{HVAC}$ (e.g., $T_a$ and $\dot{Q}_{other}$), $B_u$ contains the columns of $B(\theta)$ that correspond to $T_a$ and $\dot{Q}_{other}$, and $B_Q$ contains the column of $B(\theta)$ that corresponds to $\dot{Q}_{HVAC}$. Rearranging Eq. 15 and 16 gives:

$$\dot{Q}_{HVAC} = (CB_Q)^{-1}(T_{z,t+1} - C(Ax_t + B_u u_t)) \quad \text{(Eq. 17)}$$

Using Eq. 17, new variables $Q_h$ and $Q_c$ can be defined as the positive and negative parts of $\dot{Q}_{HVAC}$, where $Q_h$ represents heating energy and $Q_c$ represents cooling energy. $Q_h$ may be the value of $\dot{Q}_{HVAC}$ when $\dot{Q}_{HVAC}$ is positive (i.e., when heating is being provided to building zone 202) and may be bounded between zero and a maximum heating value $Q_{h,max}$. Similarly, $Q_c$ may be equal to $-\dot{Q}_{HVAC}$ when $\dot{Q}_{HVAC}$ is negative (i.e., when cooling is being provided to building zone 202) and may be bounded between zero and a maximum cooling value $Q_{c,max}$. Since these variables $Q_h$ and $Q_c$ may be bounded, saturation may occur at appropriate upper bounds as shown in the following equations:

$$Q_{h,t} = \min(\max(\dot{Q}_{HVAC}, 0), Q_{h,max})$$

$$Q_{c,t} = \min(\max(-\dot{Q}_{HVAC}, 0), Q_{c,max}) \quad \text{(Eqs. 18)}$$

Accordingly, to make forward predictions, controller 204 may use the closed-loop form of controller model 414 shown in Eq. 14 and then (partially) invert physics model 412 to determine the values of the heating and cooling duties $Q_{h,t}$ and $Q_{c,t}$. Controller 204 may then use these heating and cooling duties $Q_{h,t}$ and $Q_{c,t}$ in physics model 412 to advance the physics state $x_t$ (i.e., to predict the temperature of building zone 202 that will result from these heating and cooling duties $Q_{h,t}$ and $Q_{c,t}$). If the local controller for HVAC equipment 206 is unsaturated (i.e., $Q_{h,t}$ and $Q_{c,t}$ are below their upper bounds), then these predictions will be consistent with controller model 412 in the sense that $Cx_{t+1} = T_{z,t+1}$. Advantageously, this avoids the issue of compounding errors that may result from some forms of controller model 414.

Disturbance Model

Disturbance model 402 can be configured to predict the heat load disturbance $\dot{Q}_{other}$ affecting building zone 202. As discussed above, the heat load disturbance $\dot{Q}_{other}$ may include a variety of heat sources including internal heat generation within building zone 202 via body heat of occupants or electrical resistance of electronic devices, sunlight adding heat to building zone 202 via solar irradiance, or other sources of heat transfer other than $\dot{Q}_{HVAC}$, $\dot{Q}_a$, and $\dot{Q}_m$. Disturbance model 402 can be configured to predict the heat load disturbance $\dot{Q}_{other}$ as a function of a weather forecast, an electric load within building zone 202, a day and time, or other factors that may affect the heat load disturbance $\dot{Q}_{other}$.

Disturbance model 402 may be any of a variety of predictive models in various embodiments. In some embodiments, disturbance model 402 may include a combination of deterministic and stochastic models and can be used to predict the heat load disturbance $\dot{Q}_{other}$ as described in U.S. patent application Ser. No. 16/418,715 titled "Building Control System With Heat Load Estimation Using Deterministic and Stochastic Models" and filed May 21, 2019, the entire disclosure of which is incorporated by reference herein. In some embodiments, disturbance model 402 can be used to predict the heat load disturbance $\dot{Q}_{other}$ as described in U.S. patent application Ser. No. 16/590,783 titled "Building Control System With Heat Disturbance Estimation and Prediction" and filed Oct. 2, 2019, the entire disclosure of which is incorporated by reference herein.

In some embodiments, disturbance model 402 includes a mean load-prediction model. The mean load-prediction model may include a static function $\mathcal{Q}$ (•) such that $\dot{Q}_{other}$ is a function of a set of time-varying inputs $u_t$ that convey weather information as well as the day and time of day t (i.e., $\dot{Q}_{other} = \mathcal{Q}(u_t, t)$). The inputs $u_t$ to disturbance model 402 that convey weather information may include the ambient temperature $T_a$ as well as the cloudiness $\mathcal{C}$ (i.e., $u_t = (T_{a,t}, \mathcal{C}_t)$). In some embodiments, disturbance model 402 has the following form:

$$\dot{Q}_{other} = \mathcal{Q}(T_a, \mathcal{C}, t) = a_0 + a_1 T_a + a_2 \mathcal{C} + a_3 \phi_t \quad \text{(Eq. 19)}$$

where the $a_i$ parameters (i.e., $a_0$, $a_1$, $a_2$, and $a_3$) are trainable parameters (obtained via linear regression), and $\phi_t$ is a 7-day periodic signal that provides mean values of electric load, building occupancy, or other sources of heat generation within building zone 202. The values of $\phi_t$ can be obtained by averaging each week's data and filtering the resulting curve to remove high-frequency noise.

In some embodiments, controller 204 can train the values of the at parameters in the function $\mathcal{Q}$ (•) using known values for $\dot{Q}_{other,t}$. In conventional systems, this would be challenging because $\dot{Q}_{other}$ is not measured and it can be difficult to establish known values of $\dot{Q}_{other}$. Advantageously, controller 204 can establish known values of $\dot{Q}_{other}$ using physics model 412 to perform a back-calculation of $\dot{Q}_{other}$. For example, once physics model 412 has been trained, controller 204 can apply known (e.g., historical) values of $\dot{Q}_{HVAC}$, $T_a$, and $T_z$ as inputs to physics model 412 and solve for the unknown input $\dot{Q}_{other}$ via back-calculation. In some embodiments, controller 204 filters the time series values of $\dot{Q}_{HVAC}$, $T_a$, and $T_z$ prior to performing the back-calculation of $\dot{Q}_{other}$ in order to reduce or eliminate the effects of measurement noise in the values of HVAC, $T_a$, and $T_z$.

In some embodiments, disturbance model 402 includes both the mean load-prediction model described above as well as an autoregressive model. Because the mean load-prediction model lacks any mechanism for local feedback, the mean load-prediction model may be unable to adjust its future predictions on a day that has so far been much hotter or colder than usual. As a result, the prediction errors of the mean load-prediction model may be autocorrelated. Accordingly, controller 204 may add an autoregressive model to the mean load-prediction model to model these correlations.

The autoregressive model can be developed as follows. Suppose $\dot{Q}_{other,t}$ is the true value of $\dot{Q}_{other}$ at time t, whereas the prediction provided by the mean load-prediction model is given by the following equation:

$$\overline{Q}_{other,t} = \mathcal{Q}(T_{a,t}, \mathcal{C}_p, t) \qquad \text{(Eq. 20)}$$

The autoregressive model may include coefficients $a_n$ such that $$\hat{Q}_{other,t+1} - \overline{Q}_{other,t+1} = \sum_{n=1}^{N} a_n (Q_{other,t-n} - \overline{Q}_{other,t-n}) + \epsilon_t \qquad \text{(Eq. 21)}$$

where $\hat{Q}_{other,t+1}$ is the predicted value of $\dot{Q}_{other}$ at time t+1, $\overline{Q}_{other,t+1}$ is the output of the mean load-prediction model at time t+1, $a_n$ are the coefficients of the autoregressive model, $Q_{other,t-n}$ is the value of $\dot{Q}_{other,t}$ at time t-n, $\overline{Q}_{other,t-n}$ is the output of the mean load-prediction model at time t-n, and $\epsilon_t$ are the model prediction errors. The model prediction errors Et may be small and temporally uncorrelated. The coefficients $a_n$ can o be obtained by performing a regression process on a set of training data. For example, a least squares regression can be performed by minimizing the sum of $\epsilon_t^2$. For making future predictions, the true values $\dot{Q}_{other,k}$ for k≤t can be obtained via filtering. However, if this model is used to make multi-step predictions, the values of $\dot{Q}_{other,k}$ for k>t can be used as well. In those cases, Eq. 21 can be modified to replace $Q_{other,t-n}$ with its predicted value $\hat{Q}_{other,t-n}$.

The model of Eq. 21 can be written in linear state-space form by defining the system state $x_t$ and the output $y_t$ as shown in the following equations:

$$x_t(e_{t-N}, e_{t-N+1}, \ldots, e_{t-2}, e_{t-1}) \qquad \text{(Eq. 22)}$$

$$e_k = Q_{other,t-n} - \overline{Q}_{other,t-n} \qquad \text{(Eq. 23)}$$

$$y_t = \hat{Q}_{other,t} - \overline{Q}_{other,t} \qquad \text{(Eq. 24)}$$

which results in the equations:

$$x_{t+1} = A x_t \qquad \text{(Eq. 25)}$$

$$A = \begin{pmatrix} 0 & 1 & 0 & \ldots & 0 & 0 & 0 \\ 0 & 0 & 1 & \ldots & 0 & 0 & 0 \\ 0 & 0 & 0 & \ldots & 0 & 0 & 0 \\ \vdots & \vdots & \vdots & \ddots & \vdots & \vdots & \vdots \\ 0 & 0 & 0 & \ldots & 0 & 1 & 0 \\ 0 & 0 & 0 & \ldots & 0 & 0 & 1 \\ a_N & a_{N-1} & a_{N-2} & \ldots & a_3 & a_2 & a_1 \end{pmatrix}$$

$$y_t = C x_t \qquad \text{(Eq. 26)}$$

$$C = (a_N \quad a_{N-1} \quad a_{N-1} \quad \ldots \quad a_3 \quad a_2 \quad a_1)$$

To ensure that any multi-step predictions to be stable, the eigenvalues of A may be kept within the unit circle. If a given model is unstable, regularization can be added to the parameters at in the least-squares problem so as to shrink the optimal values. However, this strategy is generally not necessary for the datasets of interest.

In some embodiments, disturbance model 402 is a neural network model. A neural network model can be used for disturbance model 402 as an alternative to the mean load-prediction model and/or the autoregressive model described above. In some embodiments, the neural network model is a long short-term memory (LSTM) model. A LSTM model is a type of artificial recurrent neural network (RNN) architecture. Unlike standard feedforward neural networks, LSTM has feedback connections. Thus, a LSTM model can not only process single data points (e.g., instantaneous values of input data at a given time), but also entire sequences of data (e.g., time series of the input data over a given time period).

The LSTM model can be defined as follows:

$$x^+ = f_\theta^{LSTM}(x, u) \qquad \text{(Eq. 27)}$$

$$y = h_\theta^{LSTM}(x) \qquad \text{(Eq. 28)}$$

where the variables x represent the states of the LSTM system (e.g., internal states within disturbance model 402), the variables u represent the inputs to disturbance model 402, and the variables y represent the outputs of disturbance model 402. The notation $x^+$ denotes the predicted value of the states x at the next time step (e.g., time t+1) based on the values of the states x and the inputs u at the current time step (e.g., time t). The notation $x^+ = f_\theta^{LSTM}(x,u)$ and $y = h_\theta^{LSTM}(x)$ indicates that the values of the states $x^+$ and outputs y are also functions of trainable parameters θ of the LSTM model.

In the LSTM system, the state x can be partitioned into three substrates, $x_1$, $x_2$, and $x_3$, which respectively represent the velocity, position, and local prediction error of the system.

Under the nominal model, these states evolve as follows:

$$x_1^+ = x_1 \odot \phi_1 + sgm(\phi_2) \odot \tanh(\phi_3)$$

$$x_2^+ = \tanh(x_1^+) \odot sgm(\phi_3)$$

$$x_3^+ = 0 \qquad \text{(Eqs. 29)}$$

where $\phi_i$ is defined as follows:

$$\phi_i = A_i x_2 + K_i x_3 + B_i u + f_i \qquad \text{(Eq. 30)}$$

and a⊙b represents elementwise multiplication of two vectors a and b. Notably, the value of $x_1^+$ appears on the right-hand side of the equation defining $x_2^+$. The model output is then given as:

$$y = Cx + h \qquad \text{(Eq. 31)}$$

in which x is the concatenated state ($x_1$, $x_2$, $x_3$). The matrices $A_i$, $B_i$, $K_i$, and C, as well as the vectors $f_i$ and h are trainable parameters (i.e., the parameters θ), whose values are determined by fitting the LSTM model to a set of known input data (i.e., known values of u) and known output data (i.e., known values of y).

Inputs to the LSTM disturbance model may be the same as previously described. For example, inputs to the LSTM disturbance model may include measurements or predictions of ambient temperature $T_{a,t}$, measurements or predictions of cloudiness $\mathcal{C}_t$, and an indication of the current time t (e.g., time of day, day of the week, weekend, weekday, holiday, etc.). In some embodiments the time input t is provided as a binary vector t∈ $\{0,1\}^{103}$, which may include a concatenation of the daily clock time (rounded to the nearest 15 minutes, giving 96 elements) and a day of week (7 elements). For example, at 12:15 AM on a Wednesday, the binary vector may be provided as:

$$t = \left[0, \underbrace{\overset{12:15\,AM}{1}, 0,}_{96\,\text{elements}} \ldots, 0, 0, 0, \underbrace{\overset{Wednesday}{1}, 0, 0, 0, 0}_{7\,\text{elements}}\right] \quad \text{(Eq. 32)}$$

With each 15-minute step, the "1" in the first 96 elements of the binary vector may move one position to the right, cycling back to the first element at midnight on the next day. This particular representation is a compromise between expressive power and number of trainable parameters in the LSTM. In other embodiments, the first 96 elements could be replaced with 24 vectors (one for each hour of the day), each consisting of 4 elements indicating which 15-minute time period of the hour is currently active. This would reduce the overall number length of the vector considerably, but the LSTM equations would have only second powers of inputs, and thus the model could not associate any parameters with a unique 15-minute period in a week. In other embodiments, the binary vector can be replaced with a 672-element encoding of weekly 15-minute period (e.g., 672 separate inputs), which would significantly increase the number of trainable weights in the LSTM.

In some embodiments, the LSTM model is configured to output the forecasted value of $\dot{Q}_{other}$ (i.e., $\dot{Q}_{other,t} = y_t = h_\theta^{LSTM}(x_t)$) for each of a plurality of time steps within a time period (e.g., from time step t=0 to time step t=n, where n is the total number of time steps within the time period). Accordingly, controller 204 can use disturbance model 204, starting from any initial condition $x_0$, with a forecast for $u_t$ from t=0 to t=n to forecast the values of $\dot{Q}_{other,t}$ over the same time period. Controller 204 may then use the values of $\dot{Q}_{other,t}$ for each time step generated by disturbance model 204 as inputs to physics model 412.

Using a LSTM model for disturbance model 402 has two main advantages over the composite mean load-prediction model and autoregressive model. First, because the LSTM model equations are nonlinear, the LSTM model is better able to capture nonlinear dependence of $\dot{Q}_{other}$ on the input parameters. This is particularly valuable for the weather forecasts, as the solar component of $\dot{Q}_{other}$ saturates near zero for small values of cloudiness $\mathcal{C}$ and low temperatures $T_a$. The second advantage is that a LSTM disturbance model can be trained simultaneously with physics model 412, which avoids the need for a specialized back-calculation procedure to estimate $\dot{Q}_{other}$. The simultaneous training procedure is described in greater detail with reference to FIG. 5.

Combined Thermal Model

Figure 5:
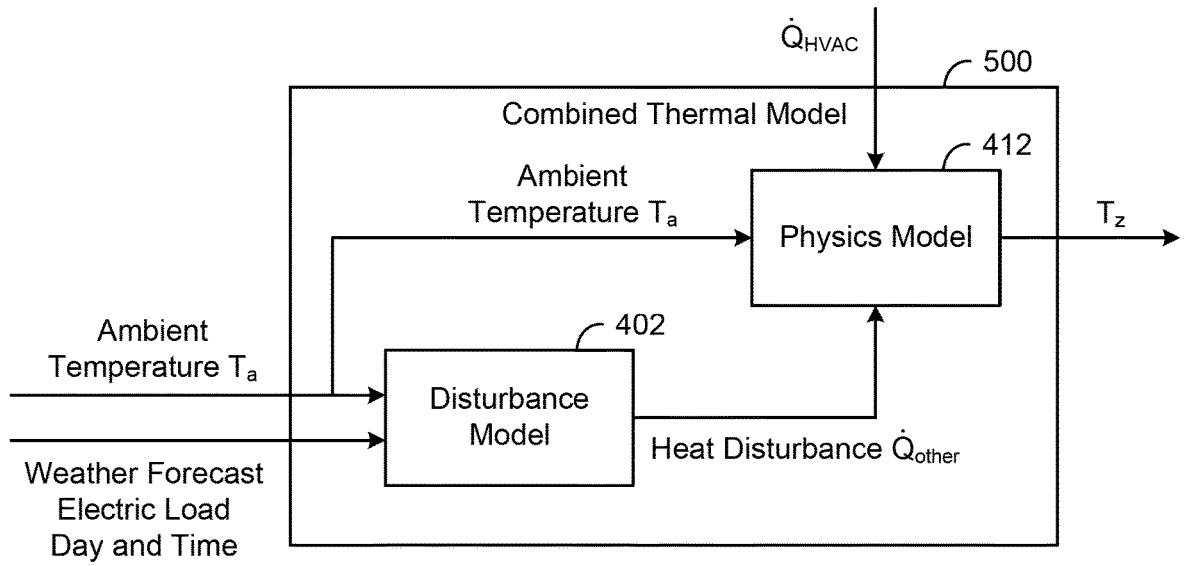
FIG. 5 is a block diagram of a combined thermal model including the physics model and the disturbance model of FIG. 4 as modules or sub-models of the combined thermal model, according to some embodiments.

Referring now to FIG. 5, a block diagram of a combined thermal model 500 is shown, according to an exemplary embodiment. Combined thermal model 500 may include both disturbance model 402 and physics model 412 as modules or sub-models of combined thermal model 500. Disturbance model 402 forms a first module or sub-model of combined thermal model 500 (e.g., a disturbance modeling module or sub-model), whereas physics model 412 forms a second module or sub-model of combined thermal model (e.g., a physics modeling module or sub-model). In some embodiments, the disturbance modeling module or sub-model has a nonlinear model structure, whereas the physics modeling module or sub-model has a linear model structure.

In some embodiments, disturbance model 402 and physics model 412 may be modular components of combined thermal model 500 and can be swapped out with other embodiments of disturbance model 402 and physics model 412 (i.e., other modules) as a result of their modular configuration.

In some embodiments, disturbance model 402 and physics model 412 are arranged in a cascaded configuration (e.g., the outputs of disturbance model 402 provided as inputs to physics model 412). Accordingly, combined thermal model 500 may be referred to as a cascaded model or cascaded thermal model in some embodiments. In some embodiments, controller model 414, closed-loop temperature model 415, or an inverse of closed-loop temperature model 415 may be added to cascaded thermal model 500 to form a combined cascaded model. Disturbance model 402 and physics model 412 can be used in the combined cascaded model to predict the temperature dynamics of building zone 202 (e.g., a predicted zone temperature, a predicted heating or cooling duty required to achieve desired temperature conditions, etc.). Controller model 414, closed-loop temperature model 415, or an inverse of closed-loop temperature model 415 may then be used to translate the predicted temperature dynamics of building zone 202 into temperature setpoints for HVAC equipment 206.

As components of combined thermal model 500, disturbance model 402 and physics model 412 may be the same as previously described with reference to FIG. 4. For example, disturbance model 402 can be configured to receive inputs of the ambient temperature $T_a$, a weather forecast (e.g., cloudiness $\mathcal{C}$), an electric load of building zone 202, and/or an indication of the day and time t. These inputs may be the same as previously described. Disturbance model 402 can be configured to output a prediction of the heat load disturbance $\dot{Q}_{other}$. Physics model 412 may receive inputs of the ambient temperature $T_a$ as well as the predicted heat load disturbance $\dot{Q}_{other}$ from disturbance model 402 and the heating or cooling duties $\dot{Q}_{HVAC}$. Physics model 412 can be used by controller 204 to determine the zone temperature $T_z$ as well as the heating or cooling duties $\dot{Q}_{HVAC}$ that will result in the predicted zone temperature $T_z$ by performing a model predictive control process. For modeling purposes, $\dot{Q}_{HVAC}$ may be treated as a controllable input u to combined thermal model 500 (e.g., a decision variable) even though the value of $\dot{Q}_{HVAC}$ may be provided as an output of the model predictive control process.

Advantageously, combined thermal model 500 can be treated as a composite system for purposes of training both disturbance model 402 and physics model 412 simultaneously. The composite system of combined thermal model 500 can be represented in state-space form with the following equations:

$$x_u^+ = Ax_u + Bu + F(x_p, p) \quad \text{(Eq. 33)}$$

$$x_p^+ = G(x_p, p) \quad \text{(Eq. 34)}$$

$$y = Cx_u + H(x_p) \quad \text{(Eq. 35)}$$

where the variable u includes the controllable inputs (i.e., manipulated variables) of combined thermal model 500 (e.g., $\dot{Q}_{HVAC}$), p includes exogenous input parameters or disturbances (e.g., ambient temperature $T_a$, cloudiness $\mathcal{C}$, time and date t, electric load within building zone 202, etc.) that may affect the temperature of building zone 202 but are not directly controlled, $x_u$ are a subset of the states x of model 500 that are affected by the controllable inputs u (e.g., the states of physics model 412), and $x_p$ are a subset the states x of model 500 that are affected mainly by the exogenous input parameters p (e.g., the states of disturbance model 402). The notation $x_u^+$ and $x_p^+$ denotes the predicted values of $x_u$ and $x_p$ at the next time step (e.g., time t+1) based on the values of $x_u$, $x_p$, and p at the current time step (e.g., time t).

In Eq. 33-35, A, B, and C are matrices having trainable parameters θ and may be the same as or similar to the matrices A, B, and C of physics model 412 as previously described. The functions F(•), G(•), and H(•) may be any nonlinear function or algorithm. For embodiments in which disturbance model 402 is a LSTM neural network model, the functions F(•), G(•), and H(•) may be functions of the trainable parameters θ the LSTM neural network model. The function F(•) is a state evolution function that can be used to predict the values of $x_u^+$ at the next time step in Eq. 33. Specifically, the function F(•) may be an output of the LSTM neural network and may be used to transform an internal state of the LSTM neural network into the heat disturbance value $\dot{Q}_{other}$. The function G(•) is a state transition function that can be used to predict the values of $x_p^+$ at the next time step in Eq. 34. The function H(•) is a measurement function that can be used to determine the values of the output variables y in Eq. 35.

In some embodiments, the values of the states $x_p$ of disturbance model 402 are constrained to the interval [−1,1]. This may result from the presence of sigmoidal and hyperbolic tangent functions in F(•). Accordingly, it may be helpful for training purposes if the other inputs to disturbance model 402 are also scaled roughly to that range to ensure that the initial (e.g., random) guess of the states $x_p$ is somewhat close to a good solution. In some embodiments, controller 204 applies an affine transformation to the other inputs to disturbance model 402 (e.g., $T_a$, $\mathcal{C}$, and t) so that each of these variables has a zero mean and unit standard deviation (i.e., a standard deviation of 1.0) over the training data. By contrast, the values of $T_a$ and $\dot{Q}_{HVAC}$ provided as inputs to physics model 412 may be left in their original engineering units as a quality initial guess for the parameters of physics model 412 may already be available.

Advantageously, all of the inputs and outputs of combined thermal model 500 are readily observable. This is a distinct advantage over models that use the heat load disturbance $\dot{Q}_{other}$ as an input or an output because the value of $\dot{Q}_{other}$ cannot be measured directly and is difficult to estimate accurately. Because $\dot{Q}_{other}$ is an internal variable within combined thermal model 500, it is not necessary to include $\dot{Q}_{other}$ in the set of training data used to train combined thermal model 500. For example, controller 204 can train combined thermal model 500 using a set of training data that includes values of the ambient temperature $T_a$, the weather forecast (e.g., cloudiness $\mathcal{C}$), the time and date t, the electric load of building zone 202, measurements of the zone temperature $T_z$, and values of the heating or cooling duty $\dot{Q}_{HVAC}$. All of these variables can be readily measured, observed, or predicted and may be available for use as training data.

Controller 204 can be configured to perform a combined training procedure to determine the parameters of physics model 412 and the parameters of disturbance model 402 simultaneously. The combined training procedure may generate values for the trainable parameters in the matrices A, B, and C as well as the trainable parameters in the functions F(•), G(•), and H(•) in Eq. 33-35. In some embodiments, the combined training procedure also generates values for trainable parameters in a state initialization function $\mathcal{X}$ (•) which can be used to generate initial values of the states $x_u$ and $x_p$. Advantageously, all of these parameters can be obtained simultaneously using only the input variables u and output variables y of combined thermal model 500.

The combined training procedure performed by controller 204 may start by defining $N_i$ as the order of the initialization function $\mathcal{X}$ (•) and defining two positive integers $N_f$ and $N_p$ as the filtering and prediction horizons respectively, with $N_f \geq N_i$. Controller 204 may reshape time series data $u_t$ and $y_t$ into rolling windows of length $N_f + N_p$ indexed by j such that:

$$u_{jk} = u_{t_j+k} \text{ and } y_{jk} = y_{t_j+k} \tag{Eqs. 36}$$

for some initial time $t_j$. Controller 204 may then specify parametric model forms $f_\theta(\bullet)$, $g_\theta(\bullet)$, $h_\theta(\bullet)$, and $\mathcal{X}_\theta(\bullet)$ in which θ represents the variable parameters. Controller 204 can determine optimal values of θ by solving the following optimization problem:

$$\min_\theta \mathcal{L}(\theta) := \sum_{j=1}^{J} \sum_{k=0}^{N_f+N_p} \|y_{jk} - h_\theta(x_{jk})\|^2 \tag{Eqs. 37}$$

$$\text{s.t. } x_{j0} = \mathcal{X}_\theta(y_{j0}, \ldots, y_{jN_i}, u_{j0}, \ldots, u_{j(N_i-1)})$$

$$x_{j(k+1)} = g_\theta(f_\theta(x_{jk}, u_{jk}), y_{j(k+1)}), \quad k \in \{0, N_f - 1\}$$

$$x_{j(k+1)} = f_\theta(x_{jk}, u_{jk}), \quad k \in \{N_f, \ldots, N_f + N_p - 1\}$$

In the optimization problem defined by Eqs. 36 and 37, each sample of the input variables u and output variables y is a trajectory of length $N_f + N_p + 1$. At each sample, the state $x_{j0}$ is initialized from the $N_i$ oldest data points using the initialization function $\mathcal{X}_\theta(\bullet)$. This initial state is then stepped with the filtering function $g_\theta(\bullet)$ for $N_f$ steps and then without the filtering function $g_\theta(\bullet)$ (e.g., using the function $f_\theta(\bullet)$ only) for an additional $N_p$ steps, with the objective function $\mathcal{L}$ (θ) consisting of all model prediction errors (i.e., during filtering and prediction). Using separate filtering and prediction horizons ensures that controller 204 is capable of making quality predictions without overly relying on the known value of y passed to the filtering function $g_\theta(\bullet)$.

By using this form, the only decision variables are θ and these decision variables θ are constant regardless of the sample index j. Accordingly, controller 204 can solve this optimization problem using stochastic gradient (or variants thereof), using gradient estimates $$\frac{d\mathcal{L}}{d\theta} \approx \sum_{j \in \mathbb{J}} \frac{d}{d\theta} \left( \sum_{k=0}^{N_f+N_p+1} \|y_{jk} - h_\theta(x_{jk})\|^2 \right) \tag{Eq. 38}$$

for small batches $\mathbb{J} \subset \{1 \ldots, J\}$. In some embodiments, the relevant functions can be implemented as Tensorflow graphs and Tensorflow optimization routines can be used to find θ.

Although combined thermal model 500 is shown as having two modules or sub-models (i.e., disturbance model 402 and physics model 412), one or more additional modules or sub-models can be added to combined thermal model 500 in various embodiments. For example, controller model 414 may be added to combined thermal model 500 to form a three-module or three-sub-model network model in some embodiments. In general, combined thermal model 500 can be modified to include any number of modules or sub-models (e.g., additional models) without departing from the teachings of the present disclosure.

Control System

Figure 6:
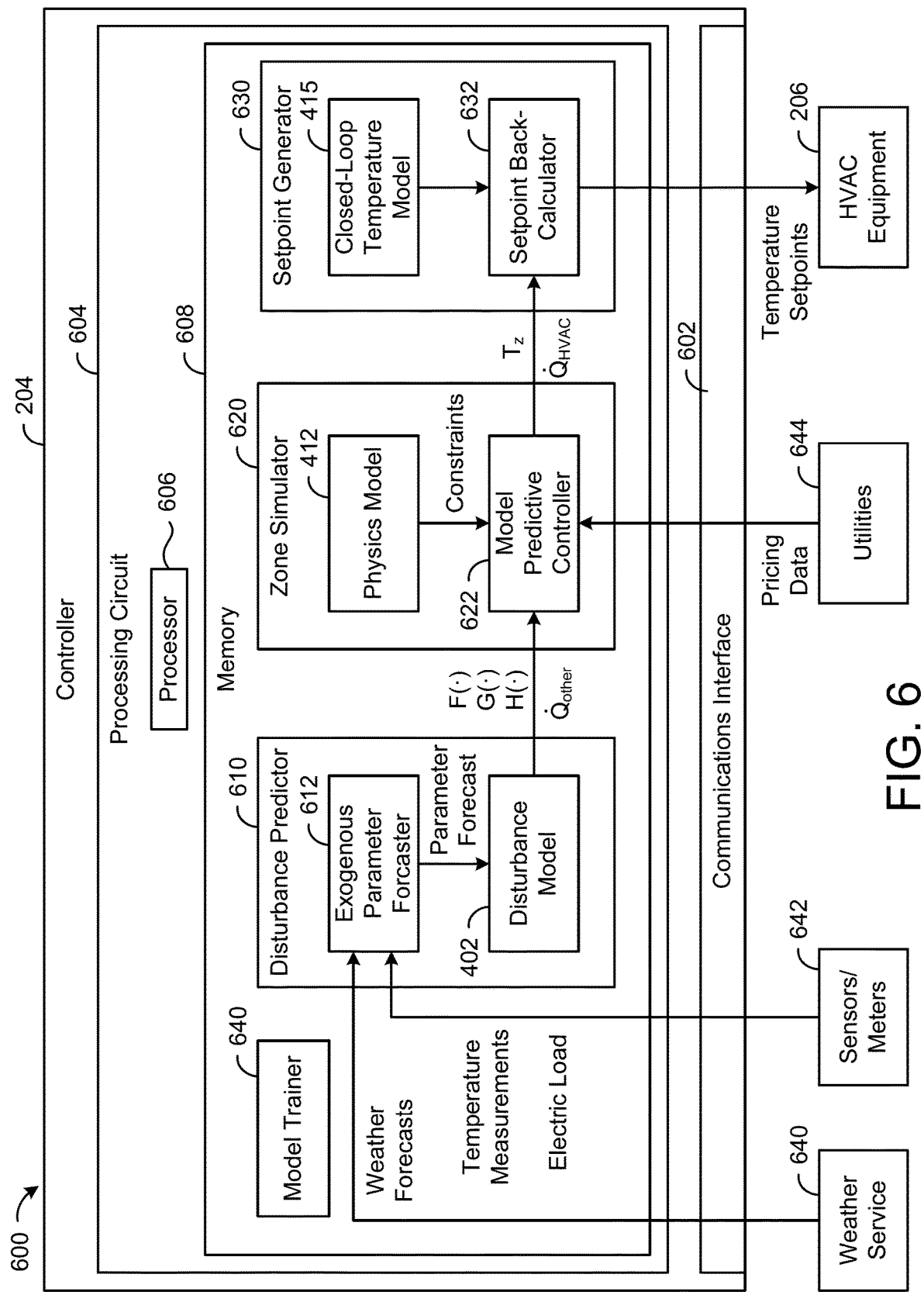
FIG. 6 is a block diagram of a control system including a controller that operates HVAC equipment to provide heating or cooling to the building zone of FIG. 2, according to some embodiments.

Referring now to FIG. 6, a block diagram of a control system 600 is shown, according to an exemplary embodiment. Control system 600 is shown to include controller 204, a weather service 640, sensors/meters 642, utilities 644, and HVAC equipment 206. Controller 204 and HVAC equipment 206 may be the same as described with reference to FIGS. 1-5. Weather service 640 may be a local or remote service (e.g., an internet-based weather service) that provides weather forecasts to controller 204. Weather forecasts include a forecast of outside air temperature, outside air humidity, outside air pressure, precipitation, cloudiness, or any other weather-related parameter. For embodiments in which ambient air 218 is outside air, the weather forecast may include predictions of the ambient air temperature $T_a$.

Sensors/meters 642 may include any of a variety of sensors (e.g., temperature sensors, humidity sensors, electric current sensors, voltage sensors, pressure sensors, etc.) or meters (e.g., electric meters) configured to provide measurements to controller 204. In some embodiments, sensors/meters 642 include zone temperature sensor 210 configured to provide measurements of the zone temperature $T_z$ and/or ambient air temperature sensor 208 configured to provide measurements of the ambient air temperature $T_a$. In some embodiments, sensors/meters 642 include an electric meter for building 10 or a zone-specific electric meter for building zone 202. Such an electric meter may provide measurements of electricity consumption within building 10 and/or within building zone 202 for use in estimating internal heat generation within building zone 202 via electrical resistance. In some embodiments, sensors/meters 642 include occupancy sensors configured to detect a number of occupants within building zone 202 for use in estimating body heat emitted by the occupants. In general, sensors/meters 642 may include any type of sensor configured to provide measurements that can be used to forecast exogenous parameters p used to predict the heat load disturbance $\dot{Q}_{other}$.

Utilities 644 may include an electric utility, a natural gas utility, a water utility, a steam utility, or any other utility provider that operates to provide resources (e.g., electricity, natural gas, water, steam, etc.) to building 10. Building 10 may consume the resources provided by utilities 644 to conduct the operations of HVAC system 100 and other building operations. In some embodiments, utilities 644 provide pricing data for the resources consumed by building 10. The pricing data may include a cost per unit of the resource consumed (e.g., $/hWh for electricity, $/liter for water, $/ft$^3$ of natural gas, etc.). In some embodiments, the pricing data may define time-varying prices for the resources consumed by building 10. For example, the pricing data may define different time ranges and a corresponding price associated with each of the time ranges. Controller 204 can be configured to take advantage of time-varying prices when determining an optimal heating and cooling strategy for building 10 (e.g., pre-cooling or pre-heating building zone 202 at times when electricity is less expensive to reduce the demand for heating/cooling during times when electricity is more expensive).

In some embodiments, the pricing data also includes demand charges. A demand charge may be a separate cost imposed by utilities 644 based on the maximum rate of consumption of a particular resource during a given time period, referred to herein as the demand charge period. For example, the demand charge for electricity may be defined in units of $/kW and calculated based on the peak rate of electricity consumption (e.g., max kW of building 10) during the demand charge period. In some embodiments, the pricing data defines a plurality of demand charge periods and a demand charge cost (e.g., $/kW) based on the maximum rate of resource consumption during each demand charge period. The demand charge periods may be discrete (i.e., non-overlapping) or may overlap completely or partially in various embodiments. Accordingly, multiple demand charge periods may be active at the same time in some embodiments. Controller 204 can be configured to account for demand charge in the model predictive control process used to determine the optimal heating and cooling strategy for building 10.

Still referring to FIG. 6, controller 204 is shown to include a communications interface 602 and a processing circuit 604. Communications interface 602 may include wired or wireless interfaces (e.g., jacks, antennas, transmitters, receivers, transceivers, wire terminals, etc.) for conducting data communications with various systems, devices, or networks. For example, communications interface 602 may include an Ethernet card and port for sending and receiving data via an Ethernet-based communications network and/or a Wi-Fi transceiver for communicating via a wireless communications network. Communications interface 602 may be configured to communicate via local area networks or wide area networks (e.g., the Internet, a building WAN, etc.) and may use a variety of communications protocols (e.g., BACnet, IP, LON, etc.).

Communications interface 602 may be a network interface configured to facilitate electronic data communications between controller 204 and various external systems or devices (e.g., weather service 640, sensors/meters 642, utilities 644, HVAC equipment 206, etc.). For example, controller 204 may receive weather forecasts from weather service 640 via communications interface 602. Controller 204 may also receive various measurements from sensors/meters 642 and pricing data from utilities 644 via communications interface 602. Controller 204 may provide temperature setpoints or other control signals to HVAC equipment 206 via communications interface 602.

Processing circuit 604 is shown to include a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 may be configured to execute computer code or instructions stored in memory 608 or received from other computer readable media (e.g., CDROM, network storage, a remote server, etc.).

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor 606 via processing circuit 604 and may include computer code for executing (e.g., by processor 606) one or more processes described herein. In some embodiments, some of the components of memory 608 are integrated a single component. However, each component of memory 608 is shown separately in FIG. 6 for ease of explanation.

In some embodiments, controller 204 is a single device having a housing that contains the various components of controller 204. For example, controller 204 may be a physical device that contains all of the components of controller 204 shown in FIG. 6. In other embodiments, the various components of controller 204 may be distributed across multiple devices which may be located in multiple different locations. For example, some components of controller 204 may be located within a local control device that is coupled to HVAC equipment 206 or located proximate to HVAC equipment 206 (e.g., within the same building zone, within the same building, etc.), whereas other components of controller 204 may be located remotely. Some components of controller 204 may be located within a remote server or cloud-based computing system that communicates with HVAC equipment 206 via a communications network (e.g., a WAN, a LAN, the Internet, etc.). The same is true of processing circuit 604. For example, processor 606, memory 608, and/or the various components of memory 608 may be components of a single physical device installed proximate HVAC equipment 206 or distributed across multiple devices (e.g., a local controller and a remote server, a local controller and a supervisory controller, multiple local controllers, multiple remote servers, etc.), each of which is configured to perform some or all of the functions of controller 204. In some embodiments, memory 608 may be removable memory such as a portable (e.g., external) hard drive, a USB memory device, or other removable memory. In general, controller 204 can include one or more devices configured to perform the functions of controller 204 described herein regardless of the physical architecture, location, or number of devices.

Additionally, it should be noted that although controller 204 and the various components of control system 600 are described primarily as controlling HVAC equipment 206 for a building, it is contemplated that the systems and methods described herein can be used in any type of control system for any type of equipment. For example, control system 600 and controller 204 can be used to control any type of environmental condition (e.g., humidity, temperature, air quality, carbon dioxide levels, pollutant levels, air pressure, air flow, lighting, etc.) within any type of space (e.g., a building zone; a vehicle such as an airplane, automobile, train, etc.; an indoor or outdoor space; a factory, etc.). Additionally, control system 600 and controller 204 can be used to control other types of systems or processes (e.g., manufacturing processes, industrial processes, construction processes, chemical processes, etc.) that are subject to disturbances regardless of whether the system or process affects environmental conditions within a building. The systems and methods described herein can readily be applied to a wide variety of control scenarios without departing from the teachings of the present disclosure.

Model Trainer

Still referring to FIG. 6, controller 204 is shown to include a model trainer 640. Model trainer 640 can be configured to perform a training procedure to train controller model 414, physics model 412, and disturbance model 402. In some embodiments, model trainer 640 performs one training procedure to train controller model 414 and another training procedure to train both physics model 412 and disturbance model 402. The training procedure for controller model 414 may include fitting controller model 414 to a set of training data (e.g., inputs u and outputs y of controller model 414) to generate values of the trainable parameters of controller model 414. The trainable parameters of controller model 414 may include, for example, the α and β parameters of Eq. 13, the parameters of the function c(•) of Eq. 14, or any other trainable parameters that may exist in controller model 414.

After controller model 414 is fully trained, controller model 414 can be used to translate a zone temperature $T_z$ and/or a heating/cooling duty $\dot{Q}_{HVAC}$ into a temperature setpoint $T_{sp}$ required to achieve the zone temperature $T_z$ and/or the heating/cooling duty $\dot{Q}_{HVAC}$.

In some embodiments, model trainer 640 trains the parameters of physics model 412 and disturbance model 402 separately. For example, model trainer 640 may apply a set of training data (e.g., inputs u and outputs y for physics model 412) to system model 412 to train the parameters within the matrices A, B, and C in Eq. 4-5. Similarly, model trainer 640 may apply a set of training data (e.g., inputs u and outputs y for disturbance model 402) to disturbance model 402 to train the at parameters of disturbance model 402 shown in Eq. 19 and/or the parameters within the matrices A and C in Eqs. 25-26.

In some embodiments, model trainer 640 performs a combined training procedure to train the parameters of physics model 412 and disturbance model 402 simultaneously. The combined training procedure may include generating values for the trainable parameters in the matrices A, B, and C as well as the trainable parameters in the functions F(•), G(•), and H(•) in Eq. 33-35. In some embodiments, the combined training procedure also generates values for trainable parameters in a state initialization function $\mathcal{X}$(•) which can be used to generate initial values of the states $x_u$ and $x_p$. Advantageously, all of these parameters can be obtained simultaneously using only the input variables u and output variables y of combined thermal model 500. The combined training procedure is described in greater detail above with reference to FIG. 5. After disturbance model 402 has been trained, disturbance model 402 can be used to predict $\dot{Q}_{other}$ as a function of weather forecasts, ambient temperature measurements or predictions, electric load measurements or predictions, or other inputs to disturbance model 402. Disturbance model 402 can also be used to calculate the values of the functions F(•), G(•), and H(•) in Eq. 33-35 for embodiments in which disturbance model 402 is a LSTM neural network model.

Disturbance Predictor

Still referring to FIG. 6, controller 204 is shown to include a disturbance predictor 610. Disturbance predictor 610 may be configured to predict the heat load disturbance $\dot{Q}_{other}$ affecting building zone 202 for each of a plurality of time steps within a time period. In some embodiments, disturbance predictor 610 is configured to calculate the values of the functions F(•), G(•), and H(•) in Eq. 33-35. Disturbance predictor 610 can calculate the values of the functions F(•), G(•), and H(•) for each of the plurality of time steps within the time period. In some embodiments, disturbance predictor 610 may be referred to as a nonlinear disturbance module or sub-model of combined thermal model 500.

In some embodiments, the time period for which the heat load disturbance $\dot{Q}_{other}$ is predicted and/or the values of the functions F(•), G(•), and H(•) are calculated is the same time period used by model predictive controller 622 to perform the model predictive control process (described in greater detail below). The time period may contain a plurality of time steps. For example, a 12-hour time period may contain 48 consecutive time steps that have a duration of 15 minutes each. The duration of the time period and the duration of the time steps may vary depending on the implementation. For example, for systems with slower system dynamics (e.g., larger time constants), a longer time step duration may be appropriate (e.g., 30 minutes, 1 hour, 2 hours, 4 hours, 6 hours, 12 hours, 1 day, etc.), whereas for systems with faster system dynamics (e.g., smaller time constants) a shorter time step duration may be appropriate (e.g., 10 minutes, 5 minutes, 1 minute, 30 seconds, 15 seconds, 5 seconds, 1 second, etc.). In various embodiments, the time period may have any duration for which predictive control is desired (e.g., 6 hours, 12 hours, 18 hours, 24 hours, 2 days, 4 days, 1 week, 2 weeks, 1 month, multiple months, etc.).

Disturbance predictor 610 is shown to include an exogenous parameter forecaster 612 and disturbance model 402. Exogenous parameter forecaster 612 may be configured to forecast the values of the exogenous parameters p used in disturbance model 402 and/or in the functions F(•), G(•), and H(•). Examples of such exogenous parameters p may include ambient temperature $T_a$, cloudiness $C$, the electric load L of building zone 202, or any other uncontrolled parameter that may affect the heat load disturbance $\dot{Q}_{other}$. Exogenous parameter forecaster 612 may generate forecasted values of the exogenous parameters p for each of the plurality of time steps within the time period. In some embodiments, exogenous parameter forecaster 612 generates the forecasted values of the exogenous parameters p as a function of the weather forecasts from weather service 640, the temperature measurements or electric load measurements from sensors/meters 642, the time of day or day of the week, measurements of predictions of building occupancy, or any other input that can be used to forecast the exogenous parameters p.

In some embodiments, disturbance predictor 610 is configured to estimate the initial values of the states $x_p$ used in disturbance model 402 and/or in the functions F(•), G(•), and H(•). As noted above, the states $x_p$ may be a subset of the states x and may include states that are primarily affected by exogenous parameters p. For example, the states $x_p$ may include the states of the combined mean load-prediction and autoregressive model shown in Eq. 22-26 for embodiments in which disturbance model 402 is the combined mean load-prediction and autoregressive model. For embodiments in which disturbance model 402 is a LSTM neural network model, the states $x_p$ may include the internal states (e.g., hidden states) of the LSTM neural network.

In some embodiments, disturbance predictor 610 uses recent values of the inputs u to disturbance model 402 and the outputs y of disturbance model 402 to estimate initial values of the states $x_p$. For state estimation of general nonlinear models, one potential approach is moving-horizon estimation (MHE), in which an optimization problem is solved to determine optimal estimates of the states x. However, such an optimization process can be challenging, as it requires the solutions to satisfy the highly nonlinear LSTM equations. To overcome these challenges, it is noted that when performing unconstrained MHE on a linear system, the associated initialization function $\mathcal{X}(\cdot)$ (i.e., the optimal solution to the MHE problem) is an affine transformation of past $u_t$ and $y_t$. Accordingly, disturbance predictor 610 may use the initialization function $\mathcal{X}(\cdot)$ and past values of the inputs u and the outputs y to estimate initial values of the states $x_p$.

In some embodiments, the initialization function $\mathcal{X}(\cdot)$ is defined as:

$$X_\theta(y_0, \ldots, y_N, u_0, \ldots, u_{N-1}) = m^x + \sum_{k=0}^{N} M_k^y y_k + \sum_{k=0}^{N-1} M_k^u u_k \quad \text{(Eq. 39)}$$

where the parameters $m^x, M_0^y, \ldots, M_N^y, M_0^u, \ldots, M_{N-1}^u$ are trainable weights θ. These weights (along with any weights associated with F(•), G(•), and/or H(•)) can be trained simultaneously using historical data as discussed above. Disturbance predictor 610 can apply past values of $u_t$ and $y_t$ as inputs to the initialization function $\mathcal{X}(\cdot)$ to estimate initial values of the states $x_p$.

Disturbance predictor 610 may provide the forecasted values of the exogenous parameters p and the estimates of the states $x_p$ as inputs to disturbance model 402 and generate the values of the heat load disturbance $\dot{Q}_{other}$ and/or the values of the functions F(•), G(•), and H(•) as an output of disturbance model 402. As discussed above, the functions F(•), G(•), and H(•) may be functions of the states $x_p$ and/or the exogenous parameters p. Accordingly, disturbance predictor 610 can readily calculate the values of the functions F(•) G(•), and H(•) once the values of the states $x_p$ and/or the exogenous parameters p have been determined. The values of the heat load disturbance $\dot{Q}_{other}$ and/or the values of the functions F(•), G(•), and H(•) may be provided as inputs to zone simulator 620.

Zone Simulator

Still referring to FIG. 6, zone simulator 620 is shown to include physics model 612 and a model predictive controller 622. In some embodiments, zone simulator 620 may be referred to as a linear physics module or sub-model of combined thermal model 500. Model predictive controller 622 may be configured to formulate and execute a model predictive control process using physics model 412 and the values of the heat load disturbance $\dot{Q}_{other}$ and/or the values of the functions F(•), G(•), and H(•) provided by disturbance predictor 610. Model predictive controller 622 may use physics model 612 to predict the dynamic temperature response of building zone 202 (i.e., predict how the states $T_z$ and $T_m$ of building zone 202 will change) as a function of the amount of heating or cooling $\dot{Q}_{HVAC}$ applied to building zone 202, as well as the inputs provided by disturbance predictor 610, at each of a plurality of time steps during a time period. Specifically, model predictive controller 622 may use physics model 612 to generate and impose constraints on the model predictive control process to ensure that the evolution of the states $T_z$ and $T_m$ follows the heat transfer dynamics of building zone 202.

The model predictive control process performed by model predictive controller 622 may include optimizing an objective function J subject to a set of constraints. The objective function J may quantify an amount of energy consumption, a cost of energy consumption, one or more demand charges resulting from the energy consumption, penalty costs (e.g., for violating temperature bounds, for changing equipment loads rapidly, etc.), or any other cost associated with operating HVAC equipment 206 (e.g., equipment degradation, equipment purchase costs, etc.). Model predictive controller 622 may optimize the objective function J by adjusting a set of decision variables. In the context of controlling HVAC equipment 206, the decision variables may include the amount of heating or cooling $\dot{Q}_{HVAC}$ generated by HVAC equipment 206 and applied to building zone 202 at each of a plurality of time steps during a given time period (i.e., the optimization period). The constraints may be based on physics model 412 and may ensure that the predicted states of building zone 202 (i.e., $T_z$ and $T_m$) respect the heat transfer dynamics of building zone 202.

A general form of an objective function J which can be optimized by model predictive controller 622 is shown in the following equation:

$$\min_{u_t} \sum_{t=0}^{N-1} J(h(x_t), u_t, p_t) \quad \text{(Eq. 40)}$$

where the notation $J(h(x_t), u_t, p_t)$ indicates that the value of the objective function J is a function of $h(x_t)$ (i.e., a function of the system states $x_t$), the inputs $u_t$, and the exogenous parameters $p_t$ at each of a plurality of time steps (e.g., from time step t=0 to time step t=N−1, where N is the total number of time steps). Model predictive controller 622 may optimize the objective function J subject to the following constraint:

$$x_{t+1} = f(x_t, u_t, p_t) \qquad \text{(Eq. 41)}$$

which may be based on physics model 412. This constraint defines the system states $x_{t+1}$ at the next time step t+1 as a function $f(\bullet)$ of the system states $x_t$, the inputs $x_t$, and the exogenous parameters $p_t$ at the current time step t.

In some embodiments, the function $f(\bullet)$ is a linear state-space representation of physics model 412 as shown in the following equation:

$$x_{t+1} = A(\theta)x_t + B_u(\theta)u_t + B_p(\theta)p_t \qquad \text{(Eq. 42)}$$

where the system states $x_t$, the inputs $u_t$, and the exogenous parameters $p_t$ are defined as:

$$x_t = \begin{bmatrix} T_{z,t} \\ T_{m,t} \end{bmatrix} \qquad \text{(Eq. 43)}$$

$$u_t = [\dot{Q}_{HVAC,t}] \qquad \text{(Eq. 44a)}$$

$$p_t = \begin{bmatrix} T_{a,t} \\ \dot{Q}_{other,t} \end{bmatrix} \qquad \text{(Eq. 44b)}$$

and the matrices $A(\theta)$, $B_u(\theta)$, and $B_p(\theta)$ include trainable system parameters (e.g., $\theta$) that can be generated by performing a training process as described previously. The matrix $B_u(\theta)$ may include the portion of $B(\theta)$, that corresponds to $\dot{Q}_{HVAC}$, whereas the matrix $B_p(\theta)$ may include the portion of $B(\theta)$, that corresponds to $T_a$ and $\dot{Q}_{other}$. The value of $\dot{Q}_{other,t}$ may be a function of the exogenous parameters $p_t$ and can be calculated by disturbance predictor 610 as a fixed input to the model predictive control process. Similarly, the value of $T_{a,t}$ may be measured by a sensor or provided by weather service 640 and provided as a fixed input to the model predictive control process. Accordingly, $\dot{Q}_{HVAC,t}$ may be the only input $u_t$ that is not fixed and therefore can be adjusted by model predictive controller 622 to optimize the objective function J.

In some embodiments, the function $f(\bullet)$ can be expressed as the following linear state-space model:

$$x_{t+1} = A(\theta)x_t + B(\theta)u_t + F(x_p, p_t) \qquad \text{(Eq. 45)}$$

where the system states $x_t$ and the inputs $u_t$ are defined as:

$$x_t = \begin{bmatrix} T_{z,t} \\ T_{m,t} \end{bmatrix} \qquad \text{(Eq. 46)}$$

$$u_t = \begin{bmatrix} \dot{Q}_{HVAC,t} \\ T_{a,t} \end{bmatrix} \qquad \text{(Eq. 47)}$$

and the value of the function $F(\bullet)$ is calculated by disturbance predictor 610 and provided as a fixed input to the model predictive control process. The value of $T_{a,t}$ may be measured by a sensor or provided by weather service 640 and provided as a fixed input to the model predictive control process. Accordingly, $\dot{Q}_{HVAC,t}$ may be the only input $u_t$ that is not fixed and therefore can be adjusted by model predictive controller 622 to optimize the objective function J. As before, the matrices $A(\theta)$ and $B(\theta)$ include trainable system parameters (e.g., $\theta$) that can be generated by performing a training process as described previously.

Advantageously, the actions performed by disturbance predictor 610 and zone simulator 620 enable controller 204 to model and control a partially nonlinear system (i.e., the temperature dynamics of building zone 202) using an entirely linear model predictive control process. The nonlinear portion of the system (i.e., the heat disturbance $\dot{Q}_{other}$ and/or the functions $F(\bullet)$, $G(\bullet)$, and $H(\bullet)$) is predicted or calculated by disturbance predictor 610 in a pre-processing step and provided as a fixed input to the model predictive control process. The remaining temperature dynamics of building zone 202 are entirely linear and can be modeled using a linear model predictive control framework (e.g., the linear state-space models shown in Eqs. 42-47). This advantage allows model predictive controller 622 to use only the linear state-space model (i.e., physics model 412) when performing the model predictive control process, which reduces computation time and uses fewer processing resources due to physics model 412 not including any nonlinear components. Any nonlinearity in the heat load disturbance $\dot{Q}_{other}$ and/or the functions $F(\bullet)$, $G(\bullet)$, and $H(\bullet)$ can be accounted for in the pre-processing steps performed by disturbance predictor 610.

In some embodiments, the objective function J can be defined as:

$$\min \Delta \sum_t \rho_t W_t(Q_t) + \sum_w \rho_w^{peak} W_w^{peak} + \lambda \Delta \sum_t (e_t^+ + e_t^-) \qquad \text{(Eq. 48)}$$

and can be optimized subject to the following constraints:

$$Q^{min} \leq Q_t \leq Q^{max} \qquad \text{(Eq. 49)}$$

$$T_t^{min} - e_t^- \leq T_{z,t} \leq T_t^{max} + e_t^+ \qquad \text{(Eq. 50)}$$

$$e_t^+, e_t^- \geq 0 \qquad \text{(Eq. 51)}$$

$$W_w^{peak} \geq \kappa_{kw} \mathcal{W}_t(Q_t) \qquad \text{(Eq. 52)}$$

$$W_0^{peak} - \overline{W}_t^{peak} \qquad \text{(Eq. 53)}$$

in addition to the constraint in Eq. 41 defining the evolution of the system states $T_{z,t}$ and $T_{m,t}$, where the subscript t is the index for time and the subscript w is the index for demand charge windows. The time t may span a fixed range $\{0, \ldots, N\}$ that extends from the beginning of the optimization period to the end of the optimization period, whereas w may vary depending on how many demand charge windows fall within the optimization period.

In Eq. 48-53, the variable $\mathcal{Q}_t(Q_t)$ is the total electricity consumption by building 10 during time step t and can be defined as:

$$W_t(Q_t) := \left(\omega^{min} + (\omega^{max} - \omega^{min})\frac{Q_t - Q^{min}}{Q^{max} - Q^{min}}\right)Q_t + W_t^{base} \qquad \text{(Eq. 54)}$$

where $Q_t$ is the average heating or cooling duty (e.g., kW) over time step t (i.e., the amount of heating or cooling provided by HVAC equipment 206), $T_{z,t}$ is the average zone air temperature of building zone 202 over time step t, $e_k^+$ and $e_k^-$ are slack variables for upper and lower comfort limits, $W_w^{peak}$ is the peak electricity demand (e.g., kW) during demand charge period w, $W_t^{base}$ is the electricity consumption rate (e.g., kW) of building 10 (included in the demand charge calculation but not optimizable), $\kappa_{kw}$ is the demand charge mask (equal to 1 if time period t is in demand charge period w, otherwise 0), $\overline{W}_t^{peak}$ is the previously attained peak demand in demand charge period w=0 up through time t (e.g., kW), $\rho_t$ is the electricity use price for time step t (e.g., $/kWh), $\rho_w^{peak}$ is the electricity demand price for demand charge period w (e.g., $/kW) amortized for time step t, $Q^{min}$ and $Q^{max}$ and lower and upper limits for the heating or cooling duty $Q_t$ (e.g., kW), $\omega^{min}$ and $\omega^{max}$ are the inverse COP of heating or cooling at minimum and maximum duties (unitless), $T_t^{min}$ and $T_t^{max}$ are lower and upper comfort limits for zone temperature $T_{z,t}$ and may be time-varying, $\lambda$ is the cost of comfort violation (e.g., $/° C.·h), and $\Delta$ is the length of the time steps (e.g., hours, minutes, etc.)

This model assumes that the (inverse of) COP varies linearly throughout the operating range of the cooling system. If $\omega^{max} \geq \omega^{min}$ (i.e., cooling is less efficient at higher loads), then this function is convex, while for $\omega^{max} \leq \omega^{min}$ (i.e., cooling is more efficient at higher loads), this function is concave (but quasiconvex). In some embodiments, $\omega^{min}=\omega^{max}$ which means the function is affine.

The constraint in Eq. 49 is a bound on the heating or cooling duty $Q_t$. The value of $Q^{min}$ may be zero in some embodiments or may have a non-zero (positive) value that indicates the minimum heating or cooling load that can be provided by HVAC equipment 206. The value of $Q^{max}$ may be a positive number and may represent the maximum heating or cooling load that can be provided by HVAC equipment. The variable $Q_t$ may be equal to the value of $\dot{Q}_{HVAC,t}$ when HVAC equipment 206 operates in a heating-only mode (i.e., only heating is provided, no cooling) or equal to the value of $-\dot{Q}_{HVAC,t}$ when HVAC equipment 206 operates in a cooling-only mode (i.e., only cooling is provided, no heating). If both heating and cooling are provided simultaneously, the variable $Q_t$ may be equal to the sum of the heating load and the cooling load (e.g., $Q_t=Q_{h,t}+Q_{c,t}$), where $\dot{Q}_{HVAC,t}=Q_{h,t}-Q_{c,t}$. In some embodiments, additional constraints may be added to the set of constraints considered by model predictive controller 622 to define $Q_t$ as: $Q_t=\dot{Q}_{HVAC,t}$ if HVAC equipment 206 operate in a heating only mode, $Q_t=-\dot{Q}_{HVAC,t}$ if HVAC equipment 206 operate in a cooling only mode, or $Q_t=Q_{h,t}+Q_{c,t}$ and $\dot{Q}_{HVAC,t}=Q_{h,t}-Q_{c,t}$ if HVAC equipment 206 provide both heating and cooling simultaneously.

The second and third constraints in Eqs. 50-51 implement softened comfort limits. They are simply the standard smooth reformulation of:

$$e_t^+ := \max(T_{z,t}-T_t^{max},0)$$

$$e_t^- := \max(T_t^{min}-T_{z,t},0) \quad \text{(Eqs. 55)}$$

The fourth and fifth constraints in Eqs. 52-53 are used to calculate the peak demand charge. The former is simply the standard smooth reformulation of:

$$W_w^{peak} = \max_t \kappa_{tw} W_t(Q_t)) \quad \text{(Eq. 56)}$$

while the later ensures that model predictive controller 622 considers the previously accrued peak demand. Advantageously, the objective function J is affine and all the constraints are linear, which means that the resulting model predictive control problem is a linear program provided the system model is linear in x and u (but not necessarily p).

Model predictive controller 622 can execute the model predictive control process (i.e., solving the linear optimization problem subject to the constraints) to determine the optimal values of the decision variables, including the optimal values of $Q_t$, $Q_{h,t}$, $Q_{c,t}$, and/or $\dot{Q}_{HVAC,t}$ for each time step t in the optimization period. Model predictive controller 622 can use physics model 412 and/or the constraint in Eq. 41 to predict the system states $T_{z,t}$ and $T_{m,t}$ resulting from the optimal values of $Q_t$, $Q_{h,t}$, $Q_{c,t}$, and/or $\dot{Q}_{HVAC,t}$ over the optimization period. Model predictive controller 622 may provide the optimal values of $Q_t$, $Q_{h,t}$, $Q_{c,t}$, and/or $\dot{Q}_{HVAC,t}$ (e.g., values of $Q_t$, $Q_{h,t}$, $Q_{c,t}$, and/or $\dot{Q}_{HVAC,t}$ for each time step t) and the corresponding values of the zone air temperature $T_{z,t}$ (e.g., a value of $T_{z,t}$ for each time step t) to setpoint generator 630.

It should be noted that the terms "optimal," "optimum," "optimized," and other similar terms in the present disclosure refer to the values of the decision variables and other variables generated by model predictive controller 622 by executing the model predictive control process (i.e., the optimization process). The use of these terms does not imply that the resulting values are necessarily the most optimal values that could possibly be achieved, but rather only that these values are the result of performing an optimization process. Accordingly, any values that are generated by performing an optimization process or derived from the result of an optimization process meet the definition of "optimal," "optimum," "optimized," etc. as used herein.

Setpoint Generator

Still referring to FIG. 6, controller 204 is shown to include a setpoint generator 630. Setpoint generator 630 is shown to include closed-loop temperature model 415 and setpoint back-calculator 632. Setpoint back-calculator 632 may receive the predicted zone temperature $T_z$ and/or the heating or cooling duty $\dot{Q}_{HVAC}$ from zone simulator 620 and use closed-loop temperature model 415 to back-calculate the temperature setpoint $T_{sp}$ as a function of the heating or cooling duties $\dot{Q}_{HVAC}$ and/or the predicted zone temperature $T_z$.

As discussed above, closed-loop temperature model 415 may be a closed-loop model configured to predict the value of $T_z$ at time t+1 (i.e., $\hat{T}_{z,t+1}$) given values of $T_z$ and/or $T_{sp}$ at time t. Several examples of closed-loop temperature model 415 are provided in Eqs. 12-14. The combination of closed-loop temperature model 415 and physics model 412 may include the following equations (shown above, but reproduced here):

$$\hat{T}_{z,t+1}=c(Cx_t,T_{sp,t}) \quad \text{(Eq. 57)}$$

$$\dot{Q}_{HVAC,t}=(CB_Q)^{-1}(\hat{T}_{z,t+1}-C(Ax_t+B_u u_t)) \quad \text{(Eq. 58)}$$

$$Q_{h,t}=\min(\max(\dot{Q}_{HVAC,t},0),Q_{h,max}) \quad \text{(Eq. 59)}$$

$$Q_{c,t}=\min(\max(-\dot{Q}_{HVAC,t},0),Q_{c,max}) \quad \text{(Eq. 60)}$$

$$x_{t+1}=Ax_t+B_u u_t+B_Q(Q_{h,t}-Q_{c,t}) \quad \text{(Eq. 61)}$$

in which c(•) is the closed-loop temperature model 415. When using controller model 414 to generate the heating or cooling duties $\dot{Q}_{HVAC,t}$ and/or $Q_{h,t}$ and $Q_{c,t}$, the values of $x_t$, $u_t$, and $T_{sp,t}$ may be known. Accordingly, Eq. 57-61 can be applied in ascending order to determine the values of $\dot{Q}_{HVAC,t}$ and/or $Q_{h,t}$ and $Q_{c,t}$. By contrast, the model predictive control process performed by model predictive controller 622 may generate values of $\dot{Q}_{HVAC,t}$ (or $Q_{h,t}$ and $Q_{c,t}$), $x_t$, and $u_t$, but may not generate values of $T_{sp,t}$. However, setpoint back-calculator 632 can perform a back-calculation to calculate the values of $T_{sp,t}$ from the values generated by model predictive controller 622.

Notably, Eqs. 59-60 impose the implicit constraints on the values of $Q_{h,t}$ and $Q_{c,t}$. Specifically, Eqs. 59-60 imply the following box constraints:

$$0 \leq Q_{h,t} \leq Q_{h,max}, 0 \leq Q_{c,t} \leq Q_{c,max} \tag{Eqs. 62}$$

In some embodiments, the box constraints shown in Eqs. 62 and/or the constraints that define $Q_{h,t}$ and $Q_{c,t}$ in Eqs. 59-60 are added as explicit constraints to the optimization problem solved by model predictive controller 622 to ensure that these constraints are always satisfied. This may ensure that model predictive controller 622 does not attempt to reduce cost by making $Q_{h,t}$ and/or $Q_{c,t}$ negative.

Subtracting Eq. 60 from Eq. 59 results in:

$$Q_{h,t} - Q_{c,t} = \max(\dot{Q}_{HVAC,t}, 0) - \max(-\dot{Q}_{HVAC,t}, 0) = \dot{Q}_{HVAC,t} \tag{Eq. 63}$$

which can be used to rearrange Eq. 58, resulting in:

$$\hat{T}_{z,t+1} = CB_Q(Q_{h,t} - Q_{c,t}) + C(Ax_t + B_u u_t) = Cx_{t+1} \tag{Eq. 64}$$

which also makes use of Eq. 61. Thus, in order to determine $T_{sp,t}$, only Eq. 57 remains to be satisfied:

$$Cx_{t+1} = c(Cx_t, T_t^{sp}) \tag{Eq. 65}$$

Setpoint back-calculator 632 can be configured to invert closed-loop temperature model 415 defined by equation $c(\bullet)$ to obtain an expression that can be solved directly for the temperature setpoint $T_{sp,t}$. For example, the inverted model $c^{-1}(\bullet)$ denotes the inverse of $c(\bullet)$ with respect to $T_{sp}$ such that:

$$\hat{T}_{z,t+1} = c(T_t, T_{sp,t}) \text{ implies } T_{sp,t} = c^{-1}(T_t, \hat{T}_{z,t+1}) \tag{Eqs. 66}$$

in which case the question becomes for what values of $T_t$ and $\hat{T}_{z,t+1}$ is $c^{-1}(\bullet)$ defined.

As described with reference to FIG. 4, closed-loop temperature model 415$c(\bullet)$ can be defined as either $c_1(T_t, T_{sp,t})$ or $c_2(T_t, T_{sp,t})$ as shown in the following equations:

$$\hat{T}_{z,t+1} = c_1(T_t, T_{sp,t}) = T_{sp,t} \tag{Eq. 67}$$

$$\hat{T}_{z,t+1} = c_2(T_t, T_{sp,t}) = T_t + \alpha \tanh(\beta(T_{sp,t} - T_t)) \tag{Eq. 68}$$

For the first case shown in Eq. 67, it can be seen that:

$$c_1^{-1}(T_t, \hat{T}_{z,t+1}) = \hat{T}_{z,t+1} \tag{Eq. 69}$$

Because the first embodiment of closed-loop temperature model 415$c_1(\bullet)$ predicts that the zone temperature $\hat{T}_{z,t+1}$ gets to its setpoint $T_{sp,t}$ in one time step, then the inverse model $c_1^{-1}(\bullet)$ predicts that the setpoint $T_{sp,t}$ was exactly the next temperature $\hat{T}_{z,t+1}$. In this case, the inverse closed-loop temperature model $c_1^{-1}(\bullet)$ is defined for all values of $T_t$ and $T_{z,t+1}$ and therefore no further constraints are required in the optimization problem.

In the second case shown in Eq. 68, it can be seen that:

$$c_2^{-1}(T_t, \hat{T}_{z,t+1}) = T_t + \frac{1}{\beta} \tanh^{-1}\left(\frac{\hat{T}_{z,t+1} - T_t}{\alpha}\right) \tag{Eq. 70}$$

The domain of the inverse hyperbolic tangent function $\tanh^{-1}(\bullet)$ is $(-1,1)$, which means that the closed-loop temperature model 415$c_2(\bullet)$ implicitly imposes the constraint $$|\hat{T}_{z,t+1} - T_t| < \alpha \tag{Eq. 71}$$

which can be enforced in the model predictive control problem via the two linear constraints $$T_{k+1} - T_t \leq (1 - \in)\alpha \tag{Eq. 72}$$

$$T_t - T_{k+1} \leq (1 - \in)\alpha \tag{Eq. 73}$$

in which $\in \approx 10^{-5}$ is a small tolerance that allows for non-strict inequalities to be used. For embodiments in which closed-loop temperature model 415 is equal to $c_2(\bullet)$ (Eq. 68) the constraints defined by Eqs. 72-73 may be added to the model predictive control problem to ensure that $c_2^{-1}(\bullet)$ is always defined.

In general, closed-loop temperature model 415$c(\bullet)$ may be invertible, meaning that closed-loop temperature model 415$c(\bullet)$ can be inverted to $c^{-1}(\bullet)$ to express the zone temperature setpoint $T_{sp,t}$ as a function of the zone temperature $T_{z,t}$ at time t and/or the zone temperature $T_{z,t+1}$. For some embodiments of closed-loop temperature model $c(\bullet)$, the representation of the desired set $\text{dom}(c^{-1}(\bullet))$ may be challenging. However, as long as $c(\bullet)$ is obtained via regression on known data, $c(\bullet)$ can be parameterized in such a way that this process is possible.

In summary, for an arbitrary closed-loop temperature model $c(\bullet)$, the following constraints can be added to the model predictive control problem solved by model predictive controller 622:

$$0 \leq Q_t^h \leq Q_{max}^h \tag{Eq. 74}$$

$$0 \leq Q_t^c \leq Q_{max}^c \tag{Eq. 75}$$

$$(T_t, T_{t+1}) \in \text{dom}(c^{-1}(\bullet)) \tag{Eq. 76}$$

For the closed-loop temperature models $c_1(\bullet)$ and $c_2(\bullet)$ discussed above, the constraints shown in Eqs. 74-76 are either trivial or implementable as linear constraints. Advantageously, these constraints ensure that the trajectory of zone air temperatures $T_{z,t}$ and/or the trajectory of heating or cooling duties $\dot{Q}_{HVAC,t}$ for $t=1 \ldots N$ generated by model predictive controller 622 are within the domain of the inverted closed-loop temperature model $c^{-1}(\bullet)$ and therefore can be translated into temperature setpoints $T_{sp,t}$ by setpoint back-calculator 632. In other words, these constraints ensure that the output of the model predictive control process is achievable (i.e., dynamically feasible) by the controller that translates the output of the model predictive control process into control signals for HVAC equipment 206 (i.e., setpoint generator 630) given the dynamics defined by closed loop temperature model 415 or the inverse thereof. This advantage ensures that the cost/energy savings predicted by performing the model predictive control process are actually realizable and not lost due to the false assumption of a perfect HVAC equipment controller. With these constraints satisfied, setpoint back-calculator 632 can back-calculate the temperature setpoints $T_{sp,t}$ using the following equation:

$$T_{sp,t} = c^{-1}(T_t, T_{t+1}) \tag{Eq. 77}$$

Control Process

Referring now to FIG. 7, a flowchart of a process 700 which can be performed by controller 204 to operate HVAC equipment 206 is shown, according to an exemplary embodiment. Process 700 can be performed by one or more components of controller 204 to deliver heating or cooling to a building zone (e.g., building zone 202) as described with reference to FIGS. 1-6. Some of all of the models (e.g., disturbance model 402, physics model 412, controller model 414, etc.) and functionality of controller 204 as described above may be used in process 700.

Process 700 is shown to include estimating states of a linear physics model $x_u$ and states of a nonlinear disturbance model $x_p$ (step 702). In some embodiments, the linear physics model is physics model 412 as described with reference to FIGS. 2-6. In some embodiments, the linear physics model is a discrete-time state-space model having the following form:

$$x_{u,t+1} = Ax_{u,t} + Bu_t \quad \text{(Eq. 78)}$$

$$y_t = Cx_{u,t} \quad \text{(Eq. 79)}$$

where notation $x_{u,t+1}$ denotes the predicted values of the states $x_u$ of the linear physics model at the next time step (e.g., time step t+1) given the values of the states $x_u$ of the linear physics model at the current time step (e.g., time step t). The matrices A, B, and C, may include trainable system parameters (e.g., θ) that can be generated by performing a training process (described in greater detail below).

The system states $x_t$, inputs $u_t$, and outputs $y_t$ of the linear physics model may be defined as vectors as shown in Eq. 80-82:

$$x_{u,t} = \begin{bmatrix} T_{z,t} \\ T_{m,t} \end{bmatrix} \quad \text{(Eq. 80)}$$

$$u_t = \begin{bmatrix} \dot{Q}_{HVAC,t} \\ T_{a,t} \\ \dot{Q}_{other,t} \end{bmatrix} \quad \text{(Eq. 81)}$$

$$y_t = T_{z,t} \quad \text{(Eq. 82)}$$

where $T_{z,t}$ is the zone air temperature (e.g., the temperature of zone air 216), $T_{m,t}$ is the zone mass temperature (e.g., the temperature of building mass 212), $\dot{Q}_{HVAC,t}$ is amount of heating or cooling (e.g., kW) provided by HVAC equipment 206 to building zone 202, $T_{a,t}$ is the ambient temperature (e.g., the temperature of ambient air 218), and $\dot{Q}_{other,t}$ is the heat load disturbance affecting building zone 202. The heat load disturbance $\dot{Q}_{other,t}$ and the $T_{a,t}$ may be provided as fixed inputs to the linear physics model, whereas $\dot{Q}_{HVAC,t}$ may be a free decision variable that can be adjusted when performing the model predictive control process.

In some embodiments, the linear physics model may be the same as shown in Eqs. 78-82, with the exception that Eqs. 78, 80, and 81 may be replaced with Eqs. 83, 84, and 85 respectively as follows:

$$x_{u,t+1} = Ax_{u,t} + Bu_t + F(x_{p,t}, p_t) \quad \text{(Eq. 83)}$$

$$x_{u,t} = \begin{bmatrix} T_{z,t} \\ T_{m,t} \end{bmatrix} \quad \text{(Eq. 84)}$$

$$u_t = \begin{bmatrix} \dot{Q}_{HVAC,t} \\ T_{a,t} \end{bmatrix} \quad \text{(Eq. 85)}$$

where the function F(•) represents the heat load disturbance $\dot{Q}_{other,t}$ and may be provided as a fixed input to the linear physics model (e.g., as an output of the nonlinear disturbance model).

In some embodiments, estimating the states $x_u$ of the linear physics model includes setting both the initial value of the zone air temperature $T_{z,1}$ at time t=1 and the initial value of the zone mass temperature $T_{m,1}$ at time t=1 equal to the current value of the zone air temperature $T_z$. The current value of the zone air temperature $T_z$ can be measured by a sensor (e.g., temperature sensor 210) or otherwise provided as an input (e.g., by a user, from an external system or device, etc.) and used to set the values of both the initial value of the zone air temperature $T_{z,1}$ and the initial value of the zone mass temperature $T_{m,1}$.

The nonlinear disturbance model may be the same as disturbance model 402 as described with reference to FIGS. 2-6. The nonlinear disturbance model may include any of a variety of predictive models that operate to predict heat load disturbance $\dot{Q}_{other,t}$ or related quantities. In some embodiments, the disturbance model 402 includes a combination of deterministic and stochastic models and can be used to predict the heat load disturbance $\dot{Q}_{other}$ as described in U.S. patent application Ser. No. 16/418,715 titled "Building Control System With Heat Load Estimation Using Deterministic and Stochastic Models" and filed May 21, 2019, the entire disclosure of which is incorporated by reference herein. In some embodiments, the nonlinear disturbance model can be used to predict the heat load disturbance $\dot{Q}_{other}$ as described in U.S. patent application Ser. No. 16/590,783 titled "Building Control System With Heat Disturbance Estimation and Prediction" and filed Oct. 2, 2019, the entire disclosure of which is incorporated by reference herein.

In some embodiments, the nonlinear disturbance model includes a mean load-prediction model. The mean load-prediction model may include a static function $\mathcal{Q}$ (•) such that $\dot{Q}_{other}$ is a function of a set of time-varying inputs $u_t$ that convey weather information as well as the day and time of day t (i.e., $\dot{Q}_{other} = \mathcal{Q}(u_t, t)$). The inputs $u_t$ to the nonlinear disturbance model that convey weather information may include the ambient temperature $T_a$ as well as the cloudiness $\mathcal{C}$ (i.e., $u_t = (T_{a,t}, \mathcal{C}_t)$). In some embodiments, the nonlinear disturbance model has the following form:

$$\dot{Q}_{other} = \mathcal{Q}(T_a, \mathcal{C}, t) = a_0 + a_1 T_a + a_2 \mathcal{C} + a_3 \phi_t \quad \text{(Eq. 86)}$$

where the at parameters (i.e., $a_0$, $a_1$, $a_2$, and $a_3$) are trainable parameters (obtained via linear regression), and $\phi_t$ is a 7-day periodic signal that provides mean values of electric load, building occupancy, or other sources of heat generation within building zone 202. The values of $\phi_t$ can be obtained by averaging each week's data and filtering the resulting curve to remove high-frequency noise.

Controller 204 can train the values of the at parameters in the function $\mathcal{Q}$ (•) using known values for $\dot{Q}_{other,t}$. In conventional systems, this would be challenging because $\dot{Q}_{other}$ is not measured and it can be difficult to establish known values of $\dot{Q}_{other}$. Advantageously, controller 204 can establish known values of $\dot{Q}_{other}$ using the linear physics model to perform a back-calculation of $\dot{Q}_{other}$. For example, once the linear physics model has been trained, controller 204 can apply known (e.g., historical) values of $\dot{Q}_{HVAC}$, $T_a$, and $T_z$ as inputs to the linear physics model and solve for the unknown input $\dot{Q}_{other}$ via back-calculation. In some embodiments, controller 204 filters the time series values of $\dot{Q}_{HVAC}$, $T_a$, and $T_z$ prior to performing the back-calculation of $\dot{Q}_{other}$ in order to reduce or eliminate the effects of measurement noise in the values of $\dot{Q}_{HVAC}$, $T_a$, and $T_z$.

In some embodiments, the nonlinear disturbance model includes both the mean load-prediction model described above and an autoregressive model. The combined mean load-prediction model and autoregressive model may have the following form:

$$\dot{Q}_{other,t} = \mathcal{Q}(T_a, \mathcal{C}, t) + C_{AR} x_{P,t} \quad \text{(Eq. 87)}$$

$$x_{P,t+1} = A_{AR} x_{P,t} \quad \text{(Eq. 88)}$$

where the term $Q(T_a, C, t)$ is the same as shown in Eq. 86, the term $C_{AR}x_{P,t}$ represents the autoregressive component, $C_{AR}$ is a vector of autoregressive model coefficients as shown in the following equation:

$$C_{AR} = (a_N a_{N-1} a_{N-1} \ldots a_3 a_2 a_1) \quad \text{(Eq. 89)}$$

and $A_{AR}$ is a matrix as shown in the following equation:

$$A_{AR} = \begin{pmatrix} 0 & 1 & 0 & \ldots & 0 & 0 & 0 \\ 0 & 0 & 1 & \ldots & 0 & 0 & 0 \\ 0 & 0 & 0 & \ldots & 0 & 0 & 0 \\ \vdots & \vdots & \vdots & \ddots & \vdots & \vdots & \vdots \\ 0 & 0 & 0 & \ldots & 0 & 1 & 0 \\ 0 & 0 & 0 & \ldots & 0 & 0 & 1 \\ a_N & a_{N-1} & a_{N-2} & \ldots & a_3 & a_2 & a_1 \end{pmatrix} \quad \text{(Eq. 90)}$$

The coefficients $a_n$ of the autoregressive component can be obtained by performing a regression process on a set of training data. For example, a least squares regression can be performed by minimizing the sum of $\epsilon_t^2$ using the following equation:

$$\hat{Q}_{other,t+1} - \overline{Q}_{other,t+1} = \sum_{n=1}^{N} a_n (Q_{other,t-n} - \overline{Q}_{other,t-n}) + \epsilon_t \quad \text{(Eq. 91)}$$

where $\hat{Q}_{other,t+1}$ is the predicted value of $\dot{Q}_{other}$ at time t+1, $\overline{Q}_{other,t+1}$ is the output of the mean load-prediction model at time t+1, $a_n$ are the coefficients of the autoregressive model, $\dot{Q}_{other,t-n}$ is the value of $\dot{Q}_{other,t}$ at time t−n, $\overline{Q}_{other,t-n}$ is the output of the mean load-prediction model at time t−n, and $\epsilon_t$ are the model prediction errors.

In some embodiments, the nonlinear disturbance model is a neural network model. A neural network model can be used for the nonlinear disturbance model as an alternative to the mean load-prediction model and/or the autoregressive model described above. In some embodiments, the neural network model is a long short-term memory (LSTM) model. A LSTM model is a type of artificial recurrent neural network (RNN) architecture. Unlike standard feedforward neural networks, LSTM has feedback connections. Thus, a LSTM model can not only process single data points (e.g., instantaneous values of input data at a given time), but also entire sequences of data (e.g., time series of the input data over a given time period).

The LSTM model can be defined as follows:

$$x_{p,t+1} = f_\theta^{LSTM}(x_{p,t}, T_{a,t}, C_{p,t}) \quad \text{(Eq. 92)}$$

$$\dot{Q}_{other,t} = h_\theta^{LSTM}(x_{p,t}) \quad \text{(Eq. 93)}$$

where $x_p$ are the states of the LSTM system (e.g., internal states within the nonlinear disturbance model), $T_a$ is the ambient temperature, $C$ is the cloudiness, and t represents the time and day as described with reference to FIG. 4. The output of the LSTM model may be the same as heat load disturbance $\dot{Q}_{other}$. The function $f_\theta^{LSTM}$ is a state update function that predicts the states $x_{p,t+1}$ of the nonlinear disturbance model at the next time step t+1 as a function of the states $x_{p,t}$ of the nonlinear disturbance model at the current time step t and other exogenous parameters p such as the ambient temperature $T_a$, cloudiness $C$, and the time/day t. The function $h_\theta^{LSTM}$ translates the internal states $x_p$ of the LSTM model into the value of the heat load disturbance $\dot{Q}_{other}$.

In some embodiments, the states $x$, of the LSTM model can be partitioned into three substrates, $x_1$, $x_2$, and $x_3$, which respectively represent the velocity, position, and local prediction error of the system. Under the nominal model, these states evolve as follows:

$$x_{1,t+1} = x_{1,t} \odot \phi_1 + sgm(\phi_2) \odot \tanh(\phi_3)$$

$$x_{2,t+1} = \tanh(x_{1,t+1}) \odot sgm(\phi_3)$$

$$x_{3,t+1} \times 0 \quad \text{(Eqs. 94)}$$

where $\phi_i$ is defined as follows:

$$\phi_i = A_i x_2 + K_i x_3 + B_i u + f_i \quad \text{(Eq. 95)}$$

and $a \odot b$ represents elementwise multiplication of two vectors a and b. Notably, the value of $x_{1,t+1}$ appears on the right-hand side of the equation defining $x_{2,t+1}$. The model output is then given as:

$$y = Cx_p + h \quad \text{(Eq. 96)}$$

in which $x_p$ is the concatenated state ($x_1$, $x_2$, $x_3$) of the LSTM model. The matrices $A_i$, $B_i$, $K_i$, and $C$, as well as the vectors $f_i$ and $h$ are trainable parameters (i.e., the parameters θ), whose values are determined by fitting the LSTM model to a set of known input data (i.e., known values of u) and known output data (i.e., known values of y).

In some embodiments, step 702 includes using recent values of the inputs u to the nonlinear disturbance model and the outputs y of the nonlinear disturbance model to estimate initial values of the states $x_p$ of the nonlinear disturbance model. As noted above, the states $x_p$ may include states that are primarily affected by exogenous parameters p. For example, the states $x$, may include the states of the combined mean load-prediction and autoregressive model shown in Eq. 86-91 for embodiments in which the nonlinear disturbance model is the combined mean load-prediction and autoregressive model. For embodiments in which the nonlinear disturbance model is a LSTM neural network model, the states $x_p$ may include the internal states (e.g., hidden states) of the LSTM neural network.

For state estimation of general nonlinear models, one potential approach is moving-horizon estimation (MHE), in which an optimization problem is solved to determine optimal estimates of the states x. However, such an optimization process can be challenging, as it requires the solutions to satisfy the highly nonlinear LSTM equations. To overcome these challenges, it is noted that when performing unconstrained MHE on a linear system, the associated initialization function $\mathcal{X}(\bullet)$ (i.e., the optimal solution to the MHE problem) is an affine transformation of past $u_t$ and $y_t$. Accordingly, step 702 may include using the initialization function $\mathcal{X}(\bullet)$ and past values of the inputs u and the outputs y to estimate initial values of the states $x_p$.

In some embodiments, the initialization function $\mathcal{X}(\bullet)$ is defined as:

$$\mathcal{X}_\theta(y_0, \ldots, y_N, u_0, \ldots, u_{N-1}) = m^x + \sum_{k=0}^{N} M_k^y y_k + \sum_{k=0}^{N-1} M_k^u u_k \quad \text{(Eq. 97)}$$

where the parameters $m^x$, $M_0^y$, ..., $M_N^y$, $M_0^u$, ..., $M_{N-1}^u$ are trainable weights θ. These weights along with any weights associated with the LSTM model can be trained simultaneously using historical data as discussed above.

Step 702 may include applying past values of $u_t$ and $y_t$ as inputs to the initialization function $\mathcal{X}(\bullet)$ to estimate initial values of the states $x_p$.

Still referring to FIG. 7, process 700 is shown to include forecasting exogenous parameters p of the nonlinear disturbance model over a time period (step 704). In some embodiments, step 704 is performed by exogenous parameter forecaster 612, as described with reference to FIG. 6. Step 704 may include forecasting the values of the exogenous parameters p used in the nonlinear disturbance model and/or in the functions F(•), G(•), and H(•). Examples of such exogenous parameters p may include ambient temperature $T_a$, cloudiness $\mathcal{C}$, the electric load L of building zone 202, or any other uncontrolled parameter that may affect the heat load disturbance $\dot{Q}_{other}$.

Step 704 may include generating forecasted values of the exogenous parameters p for each of the plurality of time steps within the time period. For example, step 704 may include generating a value of each exogenous parameter p for each time step of the time period, resulting in a trajectory or time series of values for each exogenous parameter p spanning the duration of the time period. In some embodiments, step 704 includes generating the forecasted values of the exogenous parameters p as a function of the weather forecasts from weather service 640, the temperature measurements or electric load measurements from sensors/meters 642, the time of day or day of the week, measurements of predictions of building occupancy, or any other input that can be used to forecast the exogenous parameters p.

Process 700 is shown to include predicting the heat load disturbance $\dot{Q}_{other}$ over the time period using the nonlinear disturbance model (step 706). Step 706 may include applying the estimated values of the states $x_p$ of the nonlinear disturbance model and the forecasted values of the exogenous parameters p as inputs to the nonlinear disturbance model and calculating the values of the heat load disturbance $\dot{Q}_{other}$ as outputs of the nonlinear disturbance model. In some embodiments, step 706 includes estimating the values of the functions F(•), G(•), and H(•) for embodiments in which such functions are outputs of the nonlinear disturbance model.

In some embodiments, step 706 includes predicting a value of the heat load disturbance $\dot{Q}_{other}$ for each of a plurality of time steps within the time period. For example, step 706 may include using the predicted and estimated values of the states $x_{p,t}$ and the exogenous parameters $p_t$ for a given time step t to calculate the value of the heat load disturbance $\dot{Q}_{other,t}$ for that time step. This calculation may be repeated for each time step of the time period to calculate a trajectory of time series of values of the heat load disturbance $\dot{Q}_{other}$, one value for each time step of the time period.

Still referring to FIG. 7, process 700 is shown to include predicting the zone temperature $T_z$ over the time period by performing model predictive control using the linear physics model and the predicted values of the heat load disturbance $\dot{Q}_{other}$ over the time period (step 708). In some embodiments, step 708 is performed by model predictive controller 622 as described with reference to FIG. 6. The model predictive control process performed in step 708 may include optimizing an objective function J subject to a set of constraints. The objective function J may quantify an amount of energy consumption, a cost of energy consumption, one or more demand charges resulting from the energy consumption, penalty costs (e.g., for violating temperature bounds, for changing equipment loads rapidly, etc.), or any other cost associated with operating HVAC equipment 206 (e.g., equipment degradation, equipment purchase costs, etc.). Step 708 may include optimizing the objective function J by adjusting a set of decision variables. In the context of controlling HVAC equipment 206, the decision variables may include the amount of heating or cooling $\dot{Q}_{HVAC}$ generated by HVAC equipment 206 and applied to building zone 202 at each of a plurality of time steps during a given time period (i.e., the optimization period). The constraints may be based on physics model 412 and may ensure that the predicted states of building zone 202 (i.e., $T_z$ and $T_m$) respect the heat transfer dynamics of building zone 202.

A general form of an objective function J which can be optimized in step 708 is shown in the following equation:

$$\min_{u_t} \sum_{t=0}^{N-1} J(h(x_t), u_t, p_t) \qquad \text{(Eq. 98)}$$

where the notation $J(h(x_t),u_t,p_t)$ indicates that the value of the objective function J is a function of $h(x_t)$ (i.e., a function of the system states $x_t$), the inputs $u_t$, and the exogenous parameters $p_t$ at each of a plurality of time steps (e.g., from time step t=0 to time step t=N−1, where N is the total number of time steps). Step 708 may include optimizing the objective function J subject to the following constraint:

$$x_{t+1} = f(x_t, u_t, p_t) \qquad \text{(Eq. 99)}$$

which may be based on the linear physics model. This constraint defines the system states $x_{t+1}$ at the next time step t+1 as a function $f(\bullet)$ of the system states $x_t$, the inputs $x_t$, and the exogenous parameters $p_t$ at the current time step t. In some embodiments, the function $f(\bullet)$ is a linear state-space representation of the linear physics model as previously described.

Advantageously, the model predictive control process performed in step 708 may be an entirely linear model predictive control process, but may be used to model and control a partially nonlinear system. The nonlinear portion of the system (i.e., the heat disturbance $\dot{Q}_{other}$ and/or the functions F(•), G(•), and H(•)) is predicted or calculated in step 706 as a pre-processing step and provided as a fixed input to the model predictive control process in step 708. The remaining temperature dynamics of building zone 202 are entirely linear and can be modeled using a linear model predictive control framework as previously described. This advantage allows model predictive controller 622 to use only the linear state-space model (i.e., the linear physics model) when performing the model predictive control process, which reduces computation time and uses fewer processing resources due to the linear physics model not including any nonlinear components. Any nonlinearity in the heat load disturbance $\dot{Q}_{other}$ and/or the functions F(•), G(•), and H(•) can be accounted for in the pre-processing steps performed in steps 702-706.

In some embodiments, the objective function J can be defined as:

$$\min \Delta \sum_t \rho_t W_t(Q_t) + \sum_w \rho_w^{peak} W_w^{peak} + \lambda \Delta \sum_t (e_t^+ + e_t^-) \qquad \text{(Eq. 100)}$$

and can be optimized subject to the following constraints:

$$Q^{min} \leq Q_t \leq Q^{max} \qquad \text{(Eq. 101)}$$

$$T_t^{min} - e_t^- \leq T_{z,t} \leq T_t^{max} + e_t^+ \qquad \text{(Eq. 102)}$$

$$e_t^+, e_t^- \geq 0 \qquad \text{(Eq. 103)}$$

$$W_w^{peak} \geq \kappa_{t,w} \mathcal{W}_t(Q_t) \qquad \text{(Eq. 104)}$$

$$W_0^{peak} \geq \overline{W}_t^{peak} \qquad \text{(Eq. 105)}$$

in addition to the constraint in Eq. 99 defining the evolution of the system states $T_{z,t}$ and $T_{m,t}$, where the subscript t is the index for time and the subscript w is the index for demand charge windows. The time t may span a fixed range $\{0, \ldots, N\}$ that extends from the beginning of the optimization period to the end of the optimization period, whereas w may vary depending on how many demand charge windows fall within the optimization period. These constraints may be the same as previously described with reference to FIG. 6.

In Eq. 100-105, the variable $\mathcal{W}_t(Q_t)$ is the total electricity consumption by building 10 during time step t and can be defined as:

$$\mathcal{W}_t(Q_t) := \left(\omega^{min} + (\omega^{max} - \omega^{min})\frac{Q_t - Q^{min}}{Q^{max} - Q^{min}}\right)Q_t + W_t^{base} \qquad \text{(Eq. 106)}$$

where $Q_t$ is the average heating or cooling duty (e.g., kW) over time step t (i.e., the amount of heating or cooling provided by HVAC equipment 206), $T_{z,t}$ is the average zone air temperature of building zone 202 over time step t, $e_k^+$ and $e_k^-$ are slack variables for upper and lower comfort limits, $W_w^{peak}$ is the peak electricity demand (e.g., kW) during demand charge period w, $W_t^{base}$ is the electricity consumption rate (e.g., kW) of building 10 (included in the demand charge calculation but not optimizable), $\kappa_{t,w}$ is the demand charge mask (equal to 1 if time period t is in demand charge period w, otherwise 0), $\overline{W}_t^{peak}$ is the previously attained peak demand in demand charge period w=0 up through time t (e.g., kW), $\rho_t$ is the electricity use price for time step t (e.g., $/kWh), $\rho_w^{peak}$ is the electricity demand price for demand charge period w (e.g., $/kW) amortized for time step t, $Q^{min}$ and $Q^{max}$ and lower and upper limits for the heating or cooling duty $Q_t$ (e.g., kW), $\omega^{min}$ and $\omega^{max}$ are the inverse COP of heating or cooling at minimum and maximum duties (unitless), $T_t^{min}$ and $T_t^{max}$ are lower and upper comfort limits for zone temperature $T_{z,t}$ and may be time-varying, $\lambda$ is the cost of comfort violation (e.g., $/° C.·h), and $\Delta$ is the length of the time steps (e.g., hours, minutes, etc.)

Step 708 may include executing the model predictive control process (i.e., solving the linear optimization problem subject to the constraints) to determine the optimal values of the decision variables, including the optimal values of $Q_t$, $Q_{h,t}$, $Q_{c,t}$, and/or $\dot{Q}_{HVAC,t}$ for each time step t in the optimization period. Step 708 may include using the linear physics model and/or the constraint in Eq. 99 to predict the system states $T_{z,t}$ and $T_{m,t}$ resulting from the optimal values of $Q_t$, $Q_{h,t}$, $Q_{c,t}$, and/or $\dot{Q}_{HVAC,t}$ over the optimization period. In some embodiments, the values of $Q_t$, $Q_{h,t}$, $Q_{c,t}$, and/or $\dot{Q}_{HVAC,t}$ as well as the resulting values of the system states $T_{z,t}$ and $T_{m,t}$ are generated as outputs of the model predictive control process. Step 708 may include providing the optimal values of $Q_t$, $Q_{h,t}$, $Q_{c,t}$, and/or $\dot{Q}_{HVAC,t}$ (e.g., values of $Q_t$, $Q_{h,t}$, $Q_{c,t}$, and/or $\dot{Q}_{HVAC,t}$ for each time step t) and the corresponding values of the zone air temperature $T_{z,t}$ (e.g., a value of $T_{z,t}$ for each time step t) as inputs to step 710.

Still referring to FIG. 7, process 700 is shown to include back-calculating the temperature setpoint trajectory $T_{sp}$ over the time period using an inverse controller model and the predicted zone temperature trajectory $T_z$ (step 710). The inverse controller model $c^{-1}(\bullet)$ used in step 710 may be the inverse of the closed-loop controller model $c(\bullet)$ 414. As discussed above, controller model 414 may be a closed-loop model configured to predict the value of $T_z$ at time t+1 (i.e., $\hat{T}_{z,t+1}$) given values of $T_z$ and/or $T_{sp}$ at time t. Several examples of controller model 414 are provided in Eqs. 12-14.

Step 710 may include inverting controller model 414 defined by equation $c(\bullet)$ to obtain an expression that can be solved directly for the temperature setpoint $T_{sp,t}$. For example, the inverted model $c^{-1}(\bullet)$ denotes the inverse of $c(\bullet)$ with respect to $T_{sp}$ such that:

$$\hat{T}_{z,t+1} = c(T_t, T_{sp,t}) \text{ implies } T_{sp,t} = c^{-1}(T_t, \hat{T}_{z,t+1}) \qquad \text{(Eqs. 107)}$$

in which case the question becomes for what values of $T_t$ and $\hat{T}_z,t+1$ is $c^{-1}(\bullet)$ defined.

As described with reference to FIGS. 4-6, controller model 414 $c(\bullet)$ can be defined as either $c_1(T_t, T_{sp,t})$ or $c_2(T_t, T_{sp,t})$ as shown in the following equations:

$$\hat{T}_{z,t+1} = c_1(T_t, T_{sp,t}) = T_{sp,t} \qquad \text{(Eq. 108)}$$

$$\hat{T}_{z,t+1} = c_2(T_t, T_{sp,t}) = T_t + \alpha \tanh(\beta(T_{sp,t} - T_t)) \qquad \text{(Eq. 109)}$$

For the first case shown in Eq. 108, it can be seen that:

$$c_1^{-1}(T_t, \hat{T}_{z,t+1}) = \hat{T}_{z,t+1} \qquad \text{(Eq. 110)}$$

Because the first controller model $c_1(\bullet)$ predicts that the zone temperature $\hat{T}_{z,t+1}$ gets to its setpoint $T_{sp,t}$ in one time step, then the inverse model $c_1^{-1}(\bullet)$ predicts that the setpoint $T_{sp,t}$ was exactly the next temperature $\hat{T}_{z,t+1}$. In this case, the inverse controller model $c_1^{-1}(\bullet)$ is defined for all values of $T_t$ and $\hat{T}_{z,t+1}$ and therefore no further constraints are required in the optimization problem.

In the second case shown in Eq. 109, it can be seen that:

$$c_2^{-1}(T_t, \hat{T}_{z,t+1}) = T_t + \frac{1}{\beta}\tanh^{-1}\left(\frac{\hat{T}_{z,t+1} - T_t}{\alpha}\right) \qquad \text{(Eq. 111)}$$

The domain of the inverse hyperbolic tangent function $\tanh^{-1}(\bullet)$ is $(-1,1)$, which means that the controller model $c_2(\bullet)$ implicitly imposes the constraint $$|\hat{T}_{z,t+1} - T_t| < \alpha \qquad \text{(Eq. 112)}$$

which can be enforced in the model predictive control problem via the two linear constraints $$T_{k+1} - T_t \leq (1-\in)\alpha \qquad \text{(Eq. 113)}$$

$$T_t - T_{k+1} \leq (1-\in)\alpha \qquad \text{(Eq. 114)}$$

in which $\in \approx 10^{-5}$ is a small tolerance that allows for non-strict inequalities to be used. For embodiments in which controller model 414 is equal to $c_2(\bullet)$ (Eq. 109) the constraints defined by Eqs. 113-114 may be added to the model predictive control process executed in step 708 to ensure that $c_2^{-1}(\bullet)$ is always defined.

For an arbitrary controller model $c(\bullet)$, the following constraints can be added to the model predictive control problem solved in step 708:

$$0 \leq Q_t^h \leq Q_{max}^h \qquad \text{(Eq. 115)}$$

$$0 \leq Q_t^c \leq Q_{max}^c \qquad \text{(Eq. 116)}$$

$$(T_t, T_{t+1}) \in dom(c^{-1}(\bullet)) \qquad \text{(Eq. 117)}$$

For the controller models $c_1(\bullet)$ and $c_2(\bullet)$ discussed above, the constraints shown in Eqs. 115-117 are either trivial or implementable as linear constraints. Advantageously, these constraints ensure that the trajectory of zone air temperatures $T_{z,t}$ and/or the trajectory of heating or cooling duties $\dot{Q}_{HVAC,t}$ for t=1 . . . N generated in step 708 are within the domain of the inverted controller model $c^{-1}(\bullet)$ and therefore can be translated into temperature setpoints $T_{sp,t}$ by setpoint back-calculator 632. For example, with these constraints satisfied, step 710 may include back-calculating the temperature setpoints $T_{sp,t}$ using the following equation:

$$T_{sp,t}=c^{-1}(T_t,T_{t+1}) \tag{Eq. 118}$$

A value of the temperature setpoint $T_{sp,t}$ may be calculated for each time step of the time period, resulting in a trajectory or time series of the temperature setpoint $T_{sp}$.

Still referring to FIG. 7, process 700 is shown to include operating HVAC equipment using the temperature setpoint trajectory $T_{sp}$ over the time period (step 712). Step 712 may include providing the values of the temperature setpoint $T_{sp}$ as inputs to HVAC equipment 206 or a controller for HVAC equipment 206 (e.g., a thermostat, a field controller, an embedded controller within HVAC equipment 206, etc.). In some embodiments, step 712 includes operating HVAC equipment 206 to provide heating or cooling to building zone 202. The heating or cooling may be provided in the form of warm air, cooled air, warm water, cooled water, or any other mechanism by which HVAC equipment 206 may operate to add heat to building zone 202 or remove heat from building zone 202.

Although process 700 and controller 204 are described primarily with respect to temperature and heat flows, it should be understood that the systems and methods described herein can be used to control any environmental condition in a building zone. For example, the systems and methods of the present disclosure can be used to control humidity, air pressure, air quality (e.g., carbon dioxide levels, particulate matter, pollutants, etc.), air flow, or any other controllable environmental condition within building zone 202.

Model Training and Usage Process

Referring now to FIG. 8, a flowchart of a process 800 for training and using a combined thermal model is shown, according to an exemplary embodiment. In some embodiments, process 800 is performed by one or more components of controller 204 (e.g., model trainer 640) to train combined thermal model 500 and use combined thermal model 500 to operate HVAC equipment 206.

Process 800 is shown to include obtaining a physics model that models temperature dynamics of a building zone as a function of a heat load disturbance $\dot{Q}_{other}$ (step 802) and obtaining a disturbance model that predicts the heat load disturbance $\dot{Q}_{other}$ (step 804). In some embodiments, the physics model is a linear physics model. The physics model may be the same as or similar to physics model 412 or any of the linear physics models described above. The physics model may be configured to receive the heat load disturbance $\dot{Q}_{other}$ as an input. In some embodiments, the disturbance model is a nonlinear model (e.g., a mean load-prediction model, an autoregressive model, a LSTM neural network model, etc.). The disturbance model may be the same as or similar to disturbance model 402 or any of the nonlinear disturbance models described above. The disturbance model may be configured to predict the heat load disturbance $\dot{Q}_{other}$ and provide values of the heat load disturbance $\dot{Q}_{other}$ as outputs of the disturbance model.

Process 800 is shown to include combining the disturbance model and the physics model to form a combined thermal model with the heat load disturbance $\dot{Q}_{other}$ as an internal variable within the modular network (step 806). In some embodiments, the combined thermal model is the same as or similar to combined thermal model 500 as described with reference to FIG. 5. Individually, each of the physics model and the disturbance model has the heat load disturbance $\dot{Q}_{other}$ as either an input or an output. For example, the heat load disturbance $\dot{Q}_{other}$ may be an output of the disturbance model and an input to the disturbance model. However, after combining the disturbance model and the physics model to form the combined thermal model, the heat load disturbance $\dot{Q}_{other}$ may be an internal variable within the modular network. In other words, the heat load disturbance $\dot{Q}_{other}$ is a variable that is used within the combined thermal model, but is neither an input nor an output of the combined thermal model as a whole.

Process 800 is shown to include performing a combined training procedure to train parameters of the physics model and the disturbance model simultaneously without requiring values of the heat load disturbance $\dot{Q}_{other}$ (step 808). In conventional systems that train the disturbance model and the physics model separately, each training procedure may require values of the heat load disturbance $\dot{Q}_{other}$ as training data in order to train the respective models. However, by combining the disturbance model and the physics model to form the combined thermal model, the heat load disturbance $\dot{Q}_{other}$ is an internal variable within the combined thermal model.

Advantageously, combining the disturbance model and the physics model to form the combined thermal model for training purposes allows the combined thermal model to be trained using a set of training data that includes the inputs and outputs of the combined thermal model, but does not require the heat load disturbance $\dot{Q}_{other}$ data. For example, the set of training data for the combined thermal model may include values of ambient temperature $T_a$, weather forecasts, cloudiness $\mathcal{C}$, electric load, day and time t, zone air temperature $T_z$, heating or cooling load $\dot{Q}_{HVAC}$, or any other inputs or outputs of the combined thermal model. Unlike the values of the heat load disturbance $\dot{Q}_{other}$ which can be difficult to estimate using conventional techniques, all of the inputs to the combined thermal model and the outputs of the combined thermal model are readily available data that can be measured by sensors or otherwise obtained from the HVAC system. Accordingly, the combined training procedure in step 808 may be capable of training the combined thermal model without requiring values of the heat load disturbance $\dot{Q}_{other}$.

The combined training procedure performed in step 808 may include generating values for the trainable parameters in the matrices A, B, and C of the physics model as well as the trainable parameters in the functions $F(\bullet)$, $G(\bullet)$, and $H(\bullet)$ in the disturbance model. In some embodiments, the combined training procedure also generates values for trainable parameters in a state initialization function $\mathcal{Q}(\bullet)$ which can be used to generate initial values of the states $x_u$ and $x_p$. Advantageously, all of these parameters can be obtained simultaneously using only the input variables u and output variables y of the combined thermal model.

The combined training procedure performed in step 808 may start by defining $N_i$ as the order of the initialization function $\mathcal{X}(\bullet)$ and defining two positive integers $N_f$ and $N_p$ as the filtering and prediction horizons respectively, with $N_f \geq N_i$. Step 808 may include reshaping time series data $u_t$ and $y_t$ into rolling windows of length $N_f+N_p$ indexed by j such that:

$$u_{jk}=u_{tj+k} \text{ and } y_{jk}=y_{tj+k} \tag{Eqs. 119}$$

for some initial time $t_j$. Step 808 may include specifying parametric model forms $f_\theta(\bullet)$, $g_\theta(\bullet)$, $h_\theta(\bullet)$, and $\mathcal{X}_\theta(\bullet)$ in which $\theta$ represents the variable parameters.

Step 808 may include determining optimal values of $\theta$ by solving the following optimization problem:

$$\min_\theta \mathcal{L}(\theta) := \sum_{j=1}^{J} \sum_{k=0}^{N_f+N_p} \|y_{jk} - h_\theta(x_{jk})\|^2 \quad \text{(Eqs. 120)}$$

$$\text{s.t.} \quad x_{j0} = \mathcal{X}_\theta(y_{j0}, \ldots, y_{jN_i}, u_{j0}, \ldots, u_{j(N_i-1)})$$

$$x_{j(k+1)} = g_\theta(f_\theta(x_{jk}, u_{jk}), y_{j(k+1)}),$$

$$k \in \{0, \ldots, N_f - 1\}$$

$$x_{j(k+1)} = f_\theta(x_{jk}, u_{jk}), \quad k \in \{N_f, \ldots, N_f + N_p - 1\}$$

In the optimization problem defined by Eqs. 119 and 120, each sample of the input variables u and output variables y is a trajectory of length $N_f+N_p+1$. At each sample, the state $x_{j0}$ is initialized from the $N_i$ oldest data points using the initialization function $\mathcal{X}_0(\bullet)$. This initial state is then stepped with the filtering function $g_\theta(\bullet)$ for $N_f$ steps and then without the filtering function $g_\theta(\bullet)$ (e.g., using the function $f_\theta(\bullet)$ only) for an additional $N_p$ steps, with the objective function $\mathcal{L}(\theta)$ consisting of all model prediction errors (i.e., during filtering and prediction). Using separate filtering and prediction horizons ensures that the trained models are capable of making quality predictions without overly relying on the known value of y passed to the filtering function $g_\theta(\bullet)$.

By using this form, the only decision variables are $\theta$ and these decision variables $\theta$ are constant regardless of the sample index j. Accordingly, step 808 may include solving this optimization problem using stochastic gradient (or variants thereof), using gradient estimates $$\frac{d\mathcal{L}}{d\theta} \approx \sum_{j \in \mathbb{J}} \frac{d}{d\theta} \left( \sum_{k=0}^{N_f+N_p+1} \|y_{jk} - h_\theta(x_{jk})\|^2 \right) \quad \text{(Eq. 121)}$$

for small batches $\mathbb{J} \subset \{1, \ldots, J\}$. In some embodiments, the relevant functions can be implemented as Tensorflow graphs and Tensorflow optimization routines can be used to find $\theta$.

In some embodiments, step 808 includes adding a controller model (e.g., controller model 414) to the combined thermal model and performing another training process to train the parameters of the disturbance model, the physics model, and the controller model simultaneously. For example, once the disturbance model and the physics model have been trained, the controller model can be added to form a combined monolithic model. The combined monolithic model can be treated as a single model and trained using any of the training techniques described above. Advantageously, splitting the training procedure into a first training procedure (i.e., for the disturbance model and the physics model) and a second training procedure (i.e., for the disturbance model, the physics model, and the controller model) may mitigate prediction errors where the models connect. For example, the first training procedure for the disturbance model and the physics model may use actual $\dot{Q}_{HVAC}$ data (because $\dot{Q}_{HVAC}$ is an input or output of the combined thermal model) and therefore may result in parameters of the disturbance model and the physics model that result in accurate predictions of $\dot{Q}_{HVAC}$. After adding the controller model, $\dot{Q}_{HVAC}$ becomes an internal variable within the combined monolithic model and may not be tied to a set of $\dot{Q}_{HVAC}$ training data for the combined monolithic model. However, because the parameters of the disturbance model and the physics model were already trained using actual $\dot{Q}_{HVAC}$ data during the first training procedure, the second training procedure may only need to make small adjustments to the parameters of the disturbance model and the physics model. This provides several advantages (e.g., faster model parameter convergence, more accurate model parameters, less computationally intensive, etc.) relative to performing a single training procedure that attempts to train all of the parameters of the monolithic model (i.e., the disturbance model, the physics mode, and the controller model) without using a pre-trained model or models as a starting point.

Still referring to FIG. 8, process 800 is shown to include using the trained disturbance model to predict the heat load disturbance $\dot{Q}_{other}$ (step 810). Step 810 may be the same as or similar to step 706 of process 700. For example, step 810 may include applying the estimated values of the states $x_p$ of the disturbance model and the forecasted values of the exogenous parameters p as inputs to the disturbance model and calculating the values of the heat load disturbance $\dot{Q}_{other}$ as outputs of the disturbance model. In some embodiments, step 810 includes estimating the values of the functions F($\bullet$), G($\bullet$), and H($\bullet$) for embodiments in which such functions are outputs of the disturbance model.

In some embodiments, step 810 includes predicting a value of the heat load disturbance $\dot{Q}_{other}$ for each of a plurality of time steps within the time period. For example, step 810 may include using the predicted and estimated values of the states $x_{p,t}$ and the exogenous parameters $p_t$ for a given time step t to calculate the value of the heat load disturbance $\dot{Q}_{other,t}$ for that time step. This calculation may be repeated for each time step of the time period to calculate a trajectory of time series of values of the heat load disturbance $\dot{Q}_{other}$, one value for each time step of the time period.

Process 800 is shown to include operating HVAC equipment using the trained physics model and the heat load disturbance $\dot{Q}_{other}$ (step 812). In some embodiments, step 812 includes using the trained physics model and the values of the heat load disturbance $\dot{Q}_{other}$ generated in step 810 to perform a model predictive control process. The model predictive control process may be the same as described in step 708 and may produce a trajectory of zone temperature values $T_z$. In some embodiments, step 812 includes back-calculating a temperature setpoint trajectory $T_{sp}$ using an inverse controller model and the predicted zone temperature trajectory $T_z$ as described with reference to step 710 of process 700.

Step 812 may include providing the values of the temperature setpoint $T_{sp}$ as inputs to HVAC equipment 206 or a controller for HVAC equipment 206 (e.g., a thermostat, a field controller, an embedded controller within HVAC equipment 206, etc.). In some embodiments, step 812 includes operating HVAC equipment 206 to provide heating or cooling to building zone 202. The heating or cooling may be provided in the form of warm air, cooled air, warm water, cooled water, or any other mechanism by which HVAC equipment 206 may operate to add heat to building zone 202 or remove heat from building zone 202.

Although process 800 and controller 204 are described primarily with respect to temperature and heat flows, it should be understood that the systems and methods described herein can be used to control any environmental condition in a building zone. For example, the systems and methods of the present disclosure can be used to control humidity, air pressure, air quality (e.g., carbon dioxide levels, particulate matter, pollutants, etc.), air flow, or any other controllable environmental condition within building zone 202.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for heating, ventilation, or air conditioning (HVAC) equipment for a building zone, the controller comprising:
a processing circuit storing a cascaded model, the cascaded model comprising:
a disturbance model configured to predict a heat disturbance affecting the building zone as a function of one or more exogenous parameters; and
a physics model configured to predict a temperature of the building zone as a function of the heat disturbance and an amount of heating or cooling provided to the building zone by HVAC equipment;
the processing circuit configured to:
execute a combined training procedure to determine parameters of the disturbance model and parameters of the physics model, the parameters of the disturbance model defining a relationship between the heat disturbance predicted by the disturbance model and the one or more exogenous parameters provided as inputs to the disturbance model;
generate control signals for the HVAC equipment using the disturbance model to predict the heat disturbance and applying the heat disturbance as an input to the physics model; and
operate the HVAC equipment to provide the heating or cooling to the building zone in accordance with the control signals.

2. The controller of claim 1, wherein:
the disturbance model comprises a neural network model having one or more internal states; and
the processing circuit is configured to update the internal states of the neural network model using updated values of the exogenous parameters and configured to translate the internal states of the neural network into a prediction of the heat disturbance.

3. The controller of claim 1, wherein the physics model comprises a state-space model comprising a zone air temperature state representing the temperature of the building zone and at least one of a first input representing the amount of heating or cooling provided to the building zone by the HVAC equipment or a second input representing the heat disturbance.

4. The controller of claim 1, wherein generating the control signals for the HVAC equipment comprises:
using the disturbance model to predict the heat disturbance affecting the building zone in a pre-processing step;
using the physics model to generate one or more constraints on a model predictive control process; and
executing the model predictive control process to generate at least one of heating or cooling duties for the HVAC equipment or a target temperature of the building zone, wherein the heat disturbance is a fixed input to the model predictive control process.

5. The controller of claim 1, wherein generating the control signals for the HVAC equipment comprises:
executing a model predictive control process to predict at least one of heating or cooling duties for the HVAC equipment or the temperature of the building zone; and
translating at least one of the heating or cooling duties for the HVAC equipment or the temperature of the building zone into a temperature setpoint for the building zone.

6. The controller of claim 5, wherein:
the cascaded model further comprises a controller model that defines a relationship between the temperature setpoint for the building zone and at least one of the heating or cooling duties for the HVAC equipment or the temperature of the building zone; and
the processing circuit is configured to use the controller model to translate at least one of the heating or cooling duties for the HVAC equipment or the temperature of the building zone into the temperature setpoint.

7. The controller of claim 5, wherein:
the cascaded model further comprises a controller model representing a represented controller that generates the control signals for the HVAC equipment based on an output of the model predictive control process; and
the processing circuit is configured to use the controller model to generate one or more constraints on the model predictive control process that ensure the output of the model predictive control process is achievable by the controller.

8. The controller of claim 1, wherein the processing circuit is configured to forecast a time series of the exogenous parameters over a duration of a time period, the exogenous parameters comprising at least one of a time of day, a day type, a weather parameter, or a solar irradiance parameter.

9. The controller of claim 1, wherein:
the heat disturbance is an output of the disturbance model and an input to the physics model; and
the processing circuit is configured to train both the disturbance model and the physics model without requiring values of the heat disturbance as training data.

10. A method for operating heating, ventilation, or air conditioning (HVAC) equipment for a building zone, the method comprising:
obtaining a cascaded model comprising:
a disturbance model configured to predict a heat disturbance affecting the building zone as a function of one or more exogenous parameters; and
a physics model configured to predict a temperature of the building zone as a function of the heat disturbance and an amount of heating or cooling provided to the building zone by HVAC equipment;
executing a combined training procedure to determine parameters of the disturbance model and parameters of the physics model, the parameters of the disturbance model defining a relationship between the heat disturbance predicted by the disturbance model and the one or more exogenous parameters provided as inputs to the disturbance model;
generating control signals for the HVAC equipment using the disturbance model to predict the heat disturbance and applying the heat disturbance as an input to the physics model; and
operating the HVAC equipment to provide the heating or cooling to the building zone in accordance with the control signals.

11. The method of claim 10, wherein the disturbance model comprises a neural network model having one or more internal states;
the method comprising updating the internal states of the neural network model using updated values of the exogenous parameters and configured to translate the internal states of the neural network into a prediction of the heat disturbance.

12. The method of claim 10, wherein the physics model comprises a state-space model comprising a zone air temperature state representing the temperature of the building zone and at least one of a first input representing the amount of heating or cooling provided to the building zone by the HVAC equipment or a second input representing the heat disturbance.

13. The method of claim 10, wherein generating the control signals for the HVAC equipment comprises:
using the disturbance model to predict the heat disturbance affecting the building zone in a pre-processing step;
using the physics model to generate one or more constraints on a model predictive control process; and
executing the model predictive control process to generate at least one of heating or cooling duties for the HVAC equipment or a target temperature of the building zone, wherein the heat disturbance is a fixed input to the model predictive control process.

14. The method of claim 10, wherein generating the control signals for the HVAC equipment comprises:
executing a model predictive control process to predict at least one of heating or cooling duties for the HVAC equipment or the temperature of the building zone; and
translating at least one of the heating or cooling duties for the HVAC equipment or the temperature of the building zone into a temperature setpoint for the building zone.

15. The method of claim 14, wherein the cascaded model further comprises a controller model that defines a relationship between the temperature setpoint for the building zone and at least one of the heating or cooling duties for the HVAC equipment or the temperature of the building zone; and
the method comprises using the controller model to translate at least one of the heating or cooling duties for the HVAC equipment or the temperature of the building zone into the temperature setpoint.

16. The method of claim 14, wherein the cascaded model further comprises a controller model representing a controller that generates the control signals for the HVAC equipment based on an output of the model predictive control process; and
the method comprises using the controller model to generate one or more constraints on the model predictive control process that ensure the output of the model predictive control process is achievable by the controller.

17. The method of claim 10, comprising forecasting a time series of the exogenous parameters over a duration of a time period, the exogenous parameters comprising at least one of a time of day, a day type, a weather parameter, or a solar irradiance parameter.

18. The method of claim 10, wherein:
the heat disturbance is an output of the disturbance model and an input to the physics model; and
the method comprising training both the disturbance model and the physics model without requiring values of the heat disturbance as training data.

19. A method for training and using predictive models for a building zone, the method comprising:
obtaining a disturbance model that predicts a heat disturbance affecting the building zone as an output of the disturbance model;
obtaining a physics model that models temperature dynamics of the building zone as a function of the heat disturbance;

combining the disturbance model and the physics model in series to form a combined thermal model containing the heat disturbance as an internal variable within the combined thermal model, wherein the heat disturbance is provided as the output of the disturbance model and provided as an input to the physics model within the combined thermal model;

executing a training procedure to determine parameters of the disturbance model and parameters of the physics model without requiring values of the heat disturbance as training data, the parameters of the disturbance model defining a relationship between the heat disturbance predicted by the disturbance model and one or more inputs to the disturbance model; and operating heating, ventilation, or air conditioning (HVAC) equipment based on the disturbance model and the physics model to provide heating or cooling to the building zone.

* * * * *